(12) United States Patent
Casebolt

(10) Patent No.: US 7,647,677 B2
(45) Date of Patent: Jan. 19, 2010

(54) DOUBLE LOCKING SNAP HOOK

(75) Inventor: Scott C. Casebolt, St. Paul Park, MN (US)

(73) Assignee: D B Industries, Inc., Red Wing, MN (US)

( * ) Notice: Subject to any disclaimer, the term of this patent is extended or adjusted under 35 U.S.C. 154(b) by 446 days.

(21) Appl. No.: 11/517,022

(22) Filed: Sep. 7, 2006

(65) Prior Publication Data
US 2007/0062014 A1    Mar. 22, 2007

Related U.S. Application Data

(60) Provisional application No. 60/761,721, filed on Jan. 24, 2006, provisional application No. 60/718,844, filed on Sep. 20, 2005.

(51) Int. Cl.
F16B 45/02    (2006.01)
(52) U.S. Cl. ................................... 24/600.1
(58) Field of Classification Search ............ None
See application file for complete search history.

(56) References Cited

U.S. PATENT DOCUMENTS

| | | | |
|---|---|---|---|
| 370,983 A * | 10/1887 | Stahl | 24/601.1 |
| 501,875 A * | 7/1893 | Cutter | 24/599.5 |
| 1,626,866 A | 5/1927 | Neilson | |
| 1,879,168 A * | 9/1932 | Freysinger | 24/600.1 |
| 1,964,428 A * | 6/1934 | Duffy | 24/600.1 |
| 4,434,536 A | 3/1984 | Schmidt et al. | |
| 4,528,728 A | 7/1985 | Schmidt et al. | |
| 4,528,729 A | 7/1985 | Schmidt et al. | |
| 4,539,732 A | 9/1985 | Wolner | |
| 4,621,851 A | 11/1986 | Bailey, Jr. | |
| 4,657,110 A | 4/1987 | Wolner | |
| 4,908,913 A | 3/1990 | Mori | |
| 4,977,647 A * | 12/1990 | Casebolt | 24/599.5 |
| 5,002,420 A | 3/1991 | Loyd | |
| 5,174,410 A | 12/1992 | Casebolt | |
| 5,257,441 A * | 11/1993 | Barlow | 24/599.5 |
| 5,687,535 A | 11/1997 | Rohlf | |
| 5,735,025 A * | 4/1998 | Bailey | 24/600.1 |
| 6,070,308 A * | 6/2000 | Rohlf | 24/600.8 |
| 6,718,601 B1 * | 4/2004 | Choate | 24/600.2 |
| 6,832,417 B1 * | 12/2004 | Choate | 24/600.1 |
| 7,437,806 B2 * | 10/2008 | Lin | 24/599.5 |
| 7,444,723 B2 * | 11/2008 | Lin | 24/600.1 |

FOREIGN PATENT DOCUMENTS

| | | |
|---|---|---|
| DE | 202004010008 U1 | 9/2004 |
| JP | 07 031687 A | 2/1995 |

\* cited by examiner

*Primary Examiner*—Jack W. Lavinder
(74) *Attorney, Agent, or Firm*—IPLM Group, P.A.

(57) ABSTRACT

A double locking snap hook (100, 200, 300) includes a gate (120, 220, 320) reinforced by a lock (160, 260, 360), which enables the double locking snap hook (100, 200, 300) to withstand a tensile load of up to at least 3,600 pounds.

23 Claims, 19 Drawing Sheets

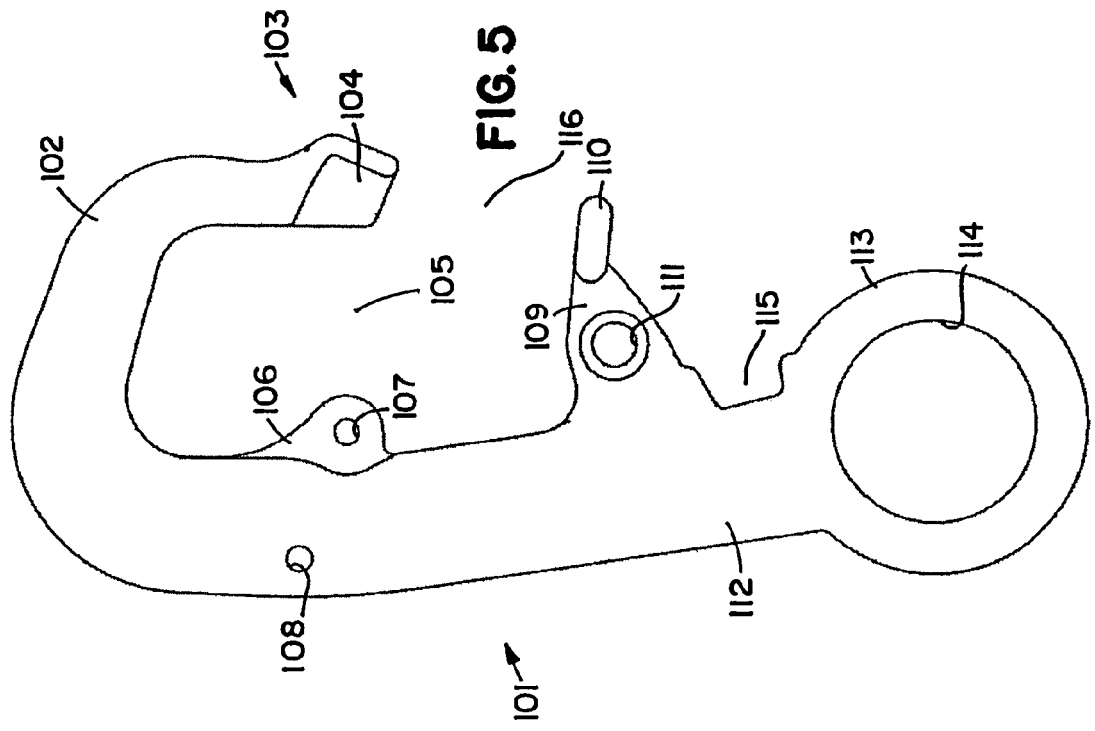
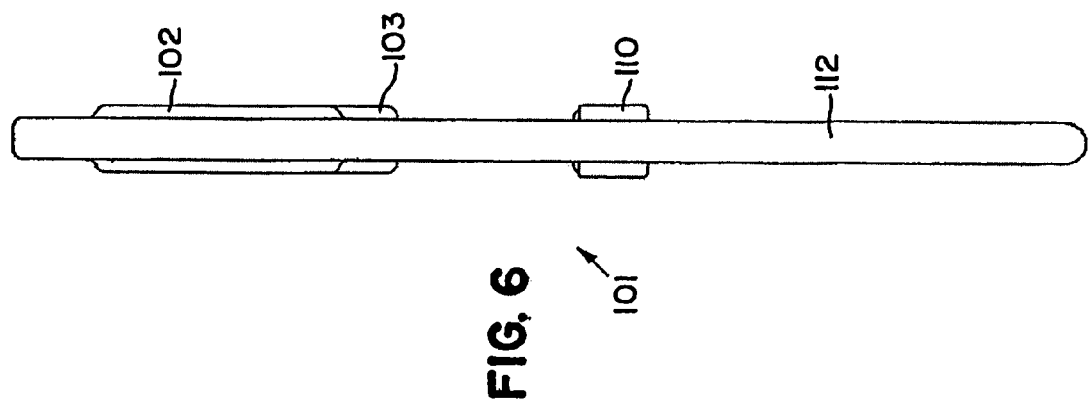

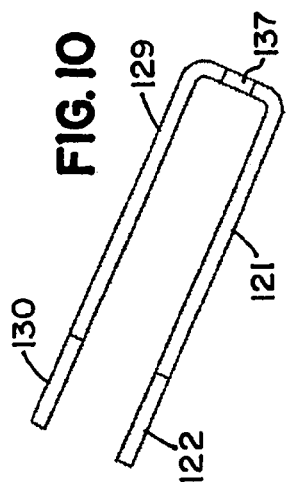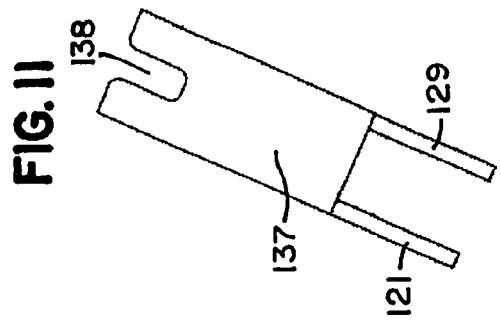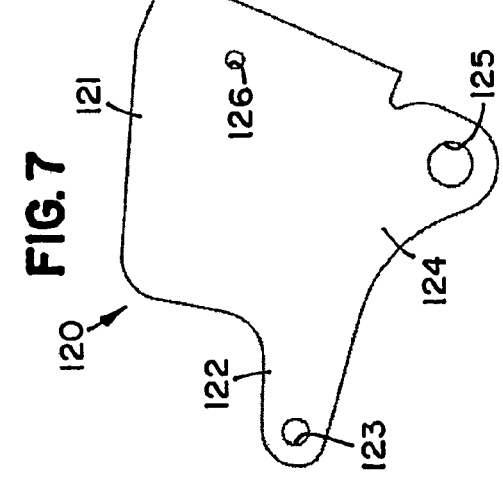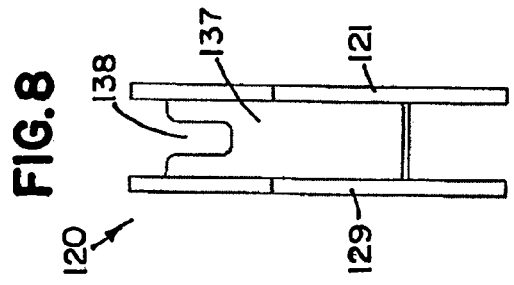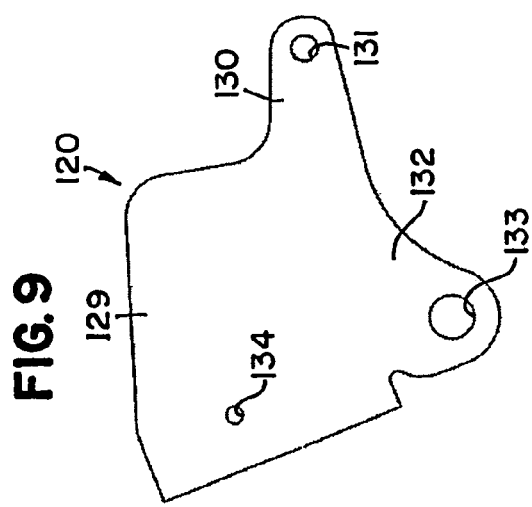

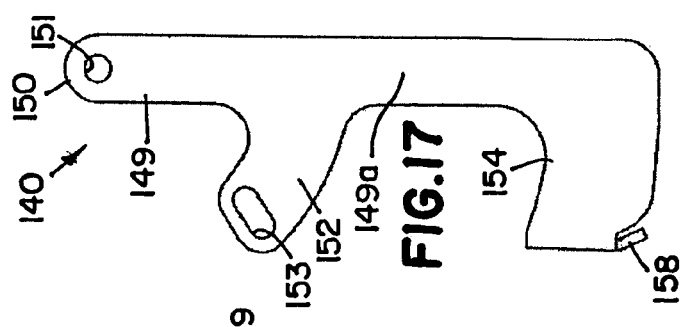
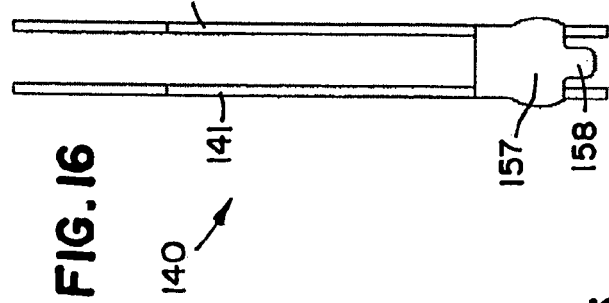
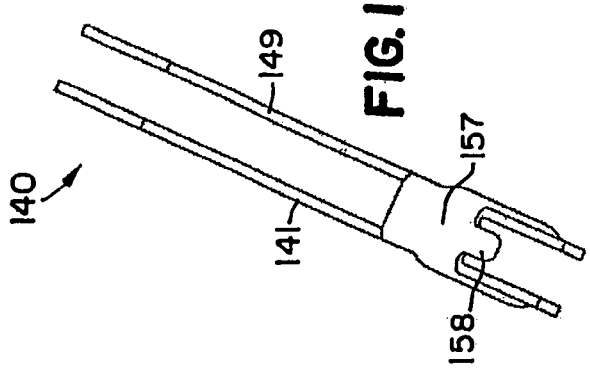
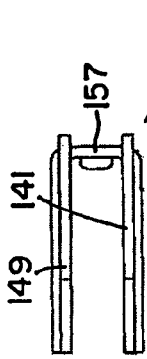
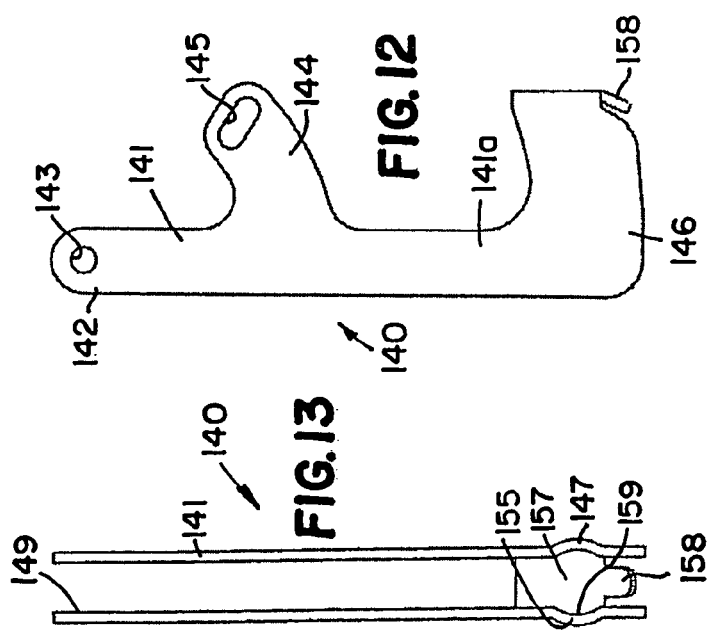

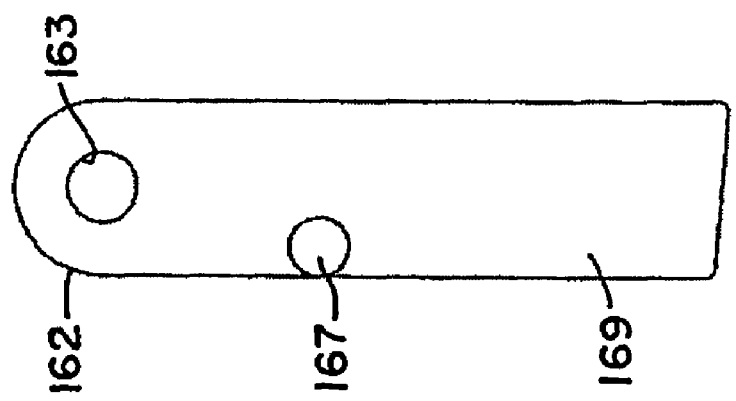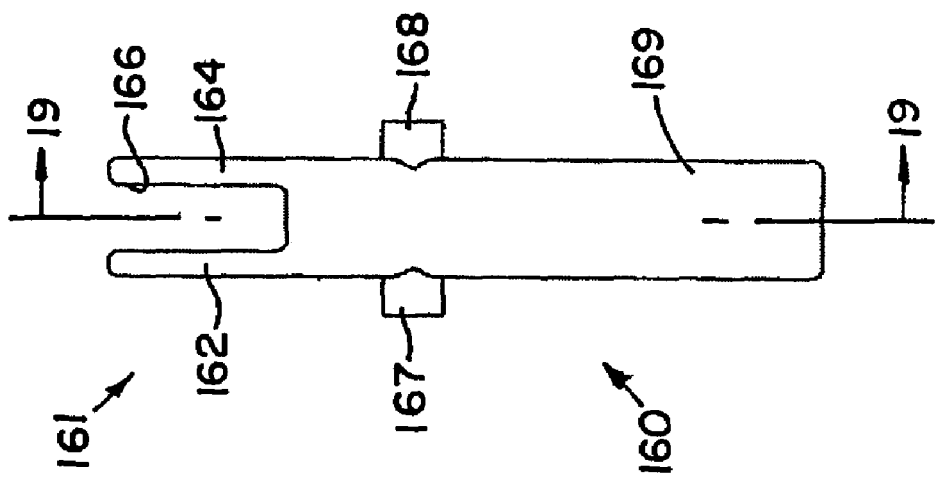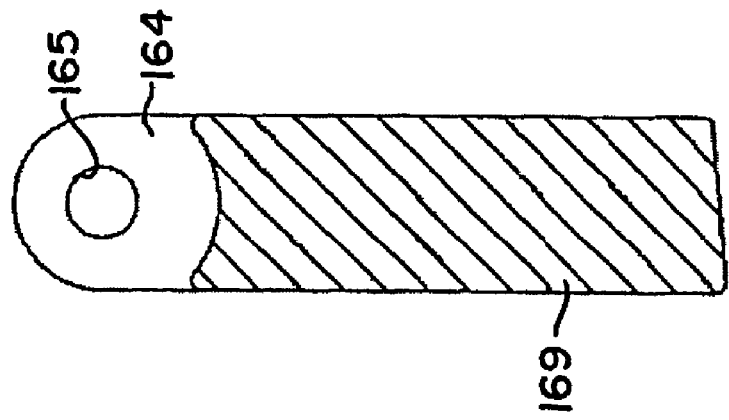

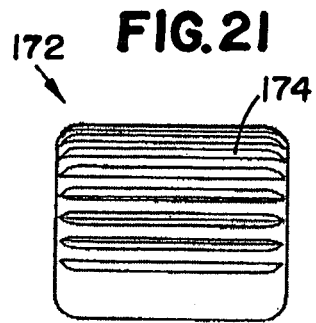
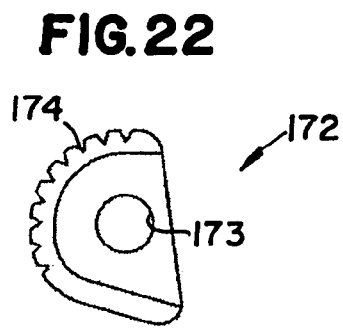
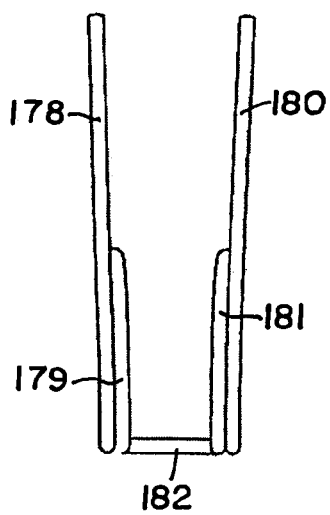
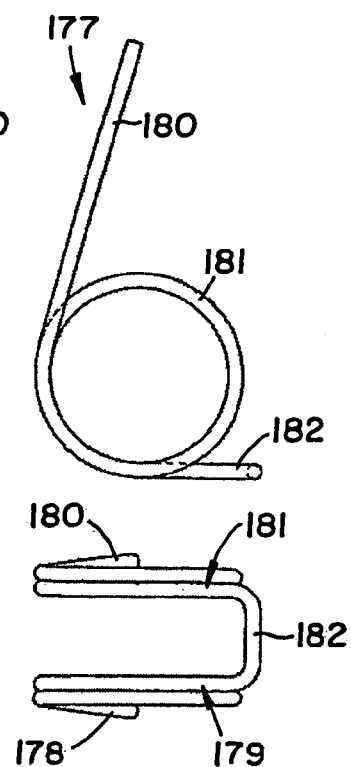
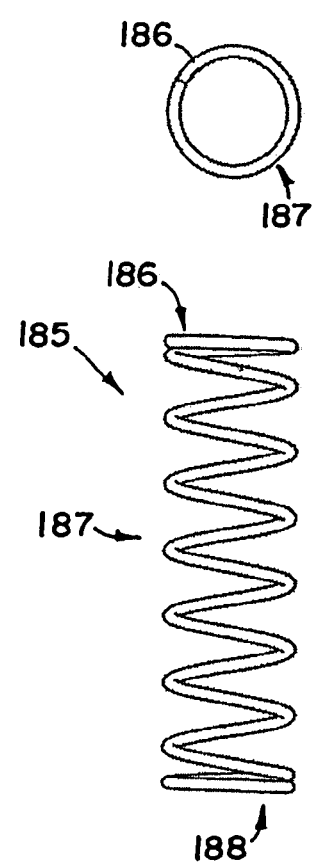

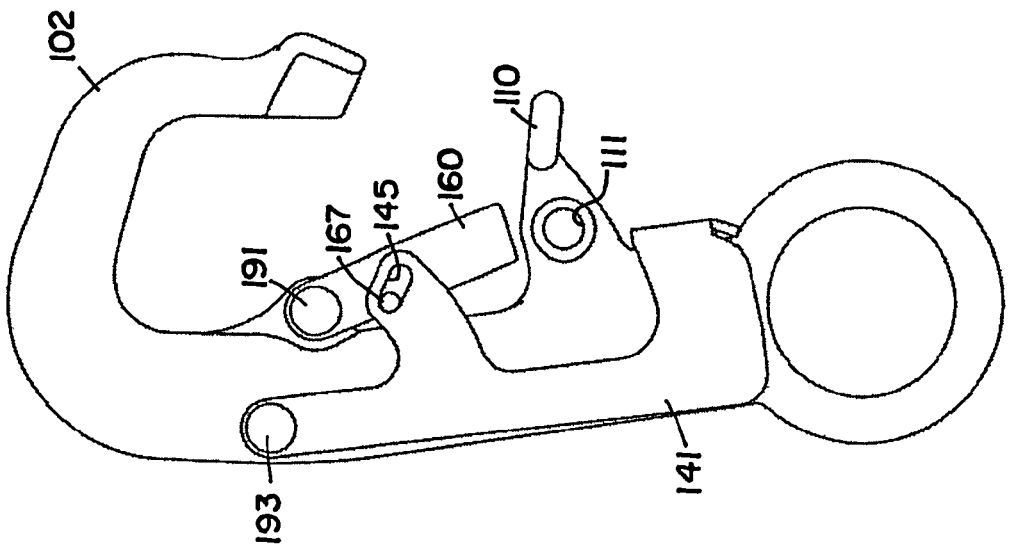
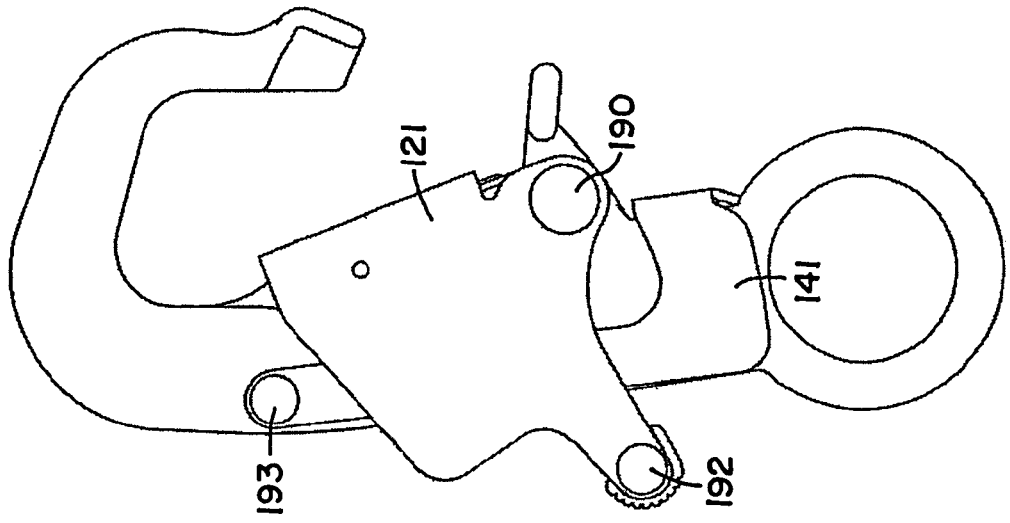

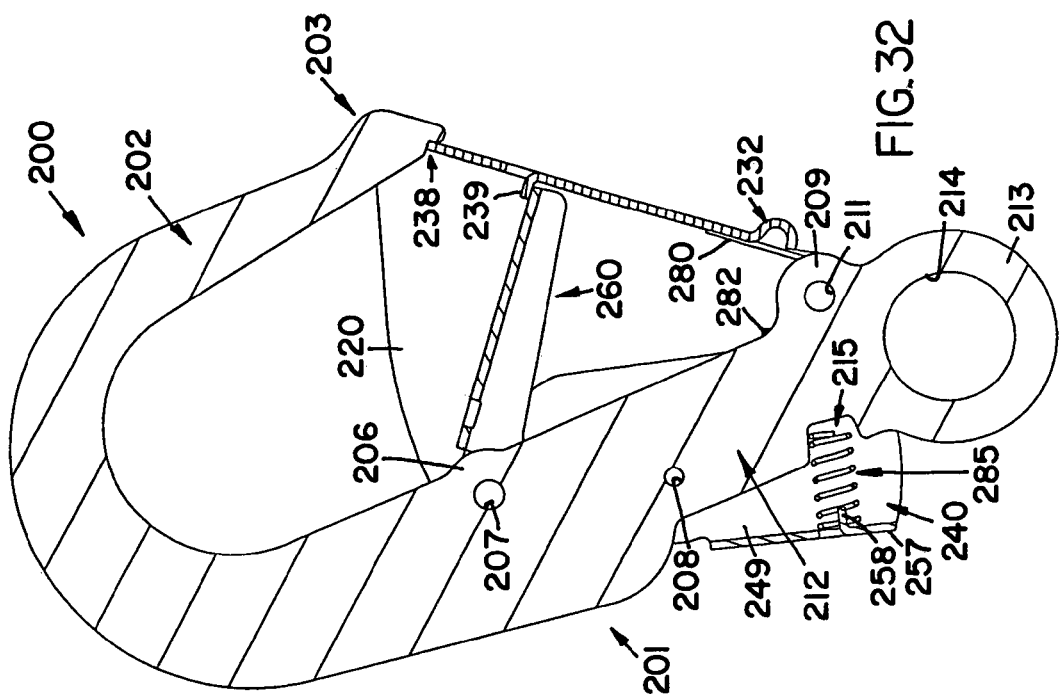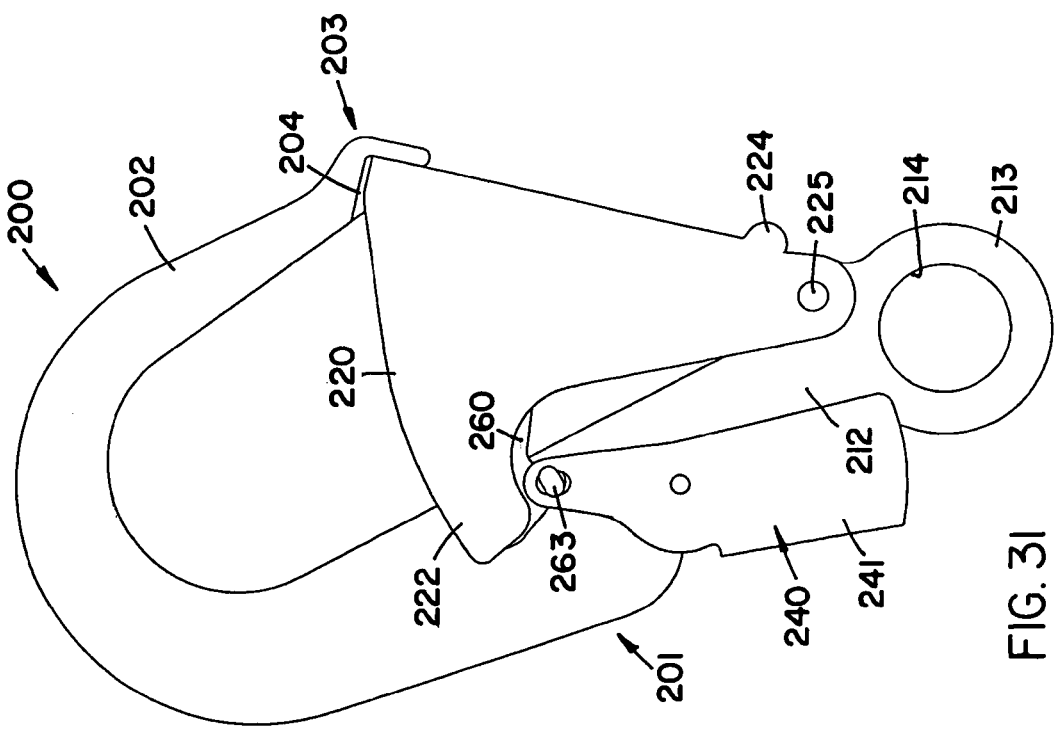

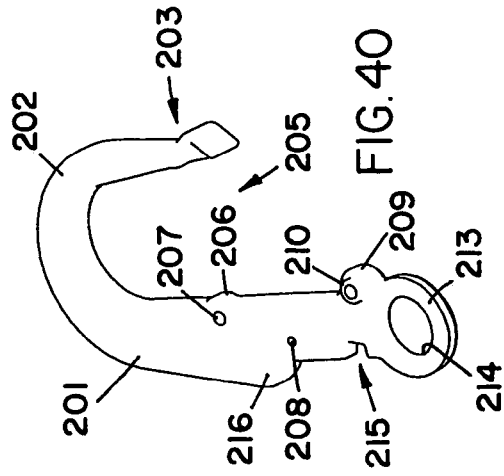
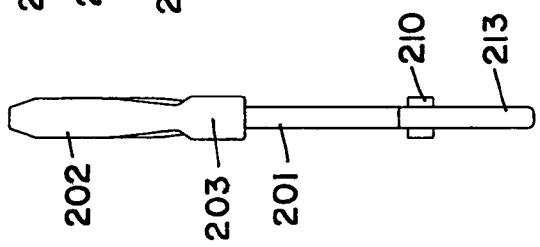
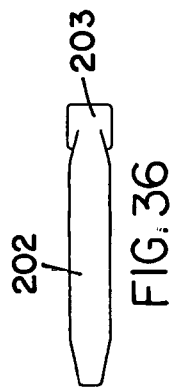
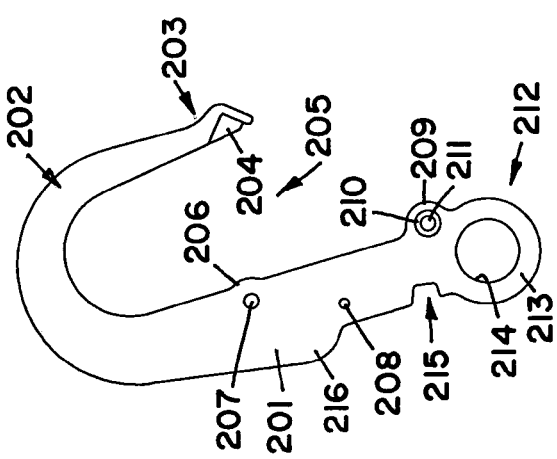
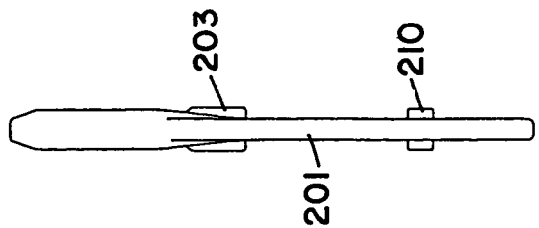
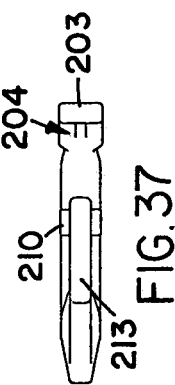

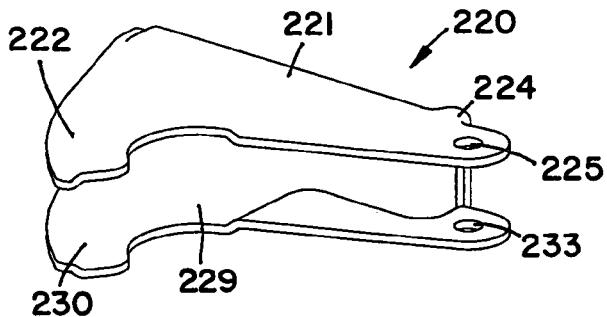
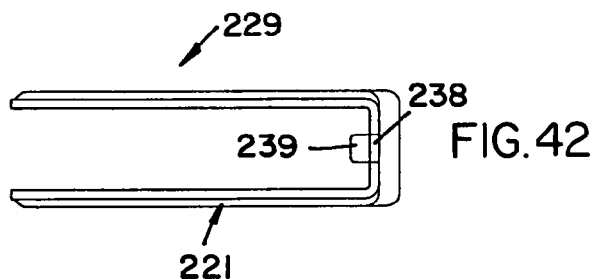
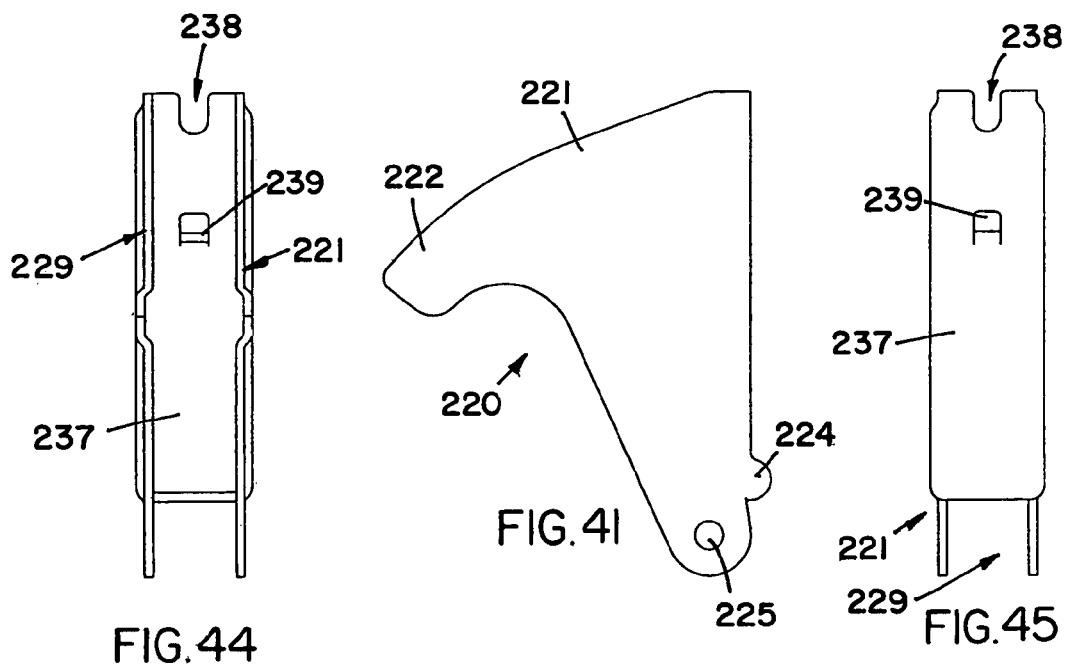
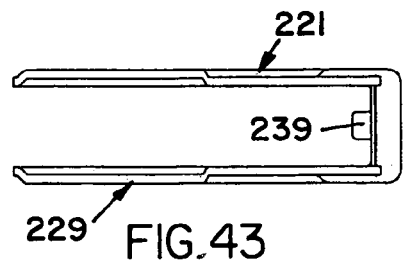

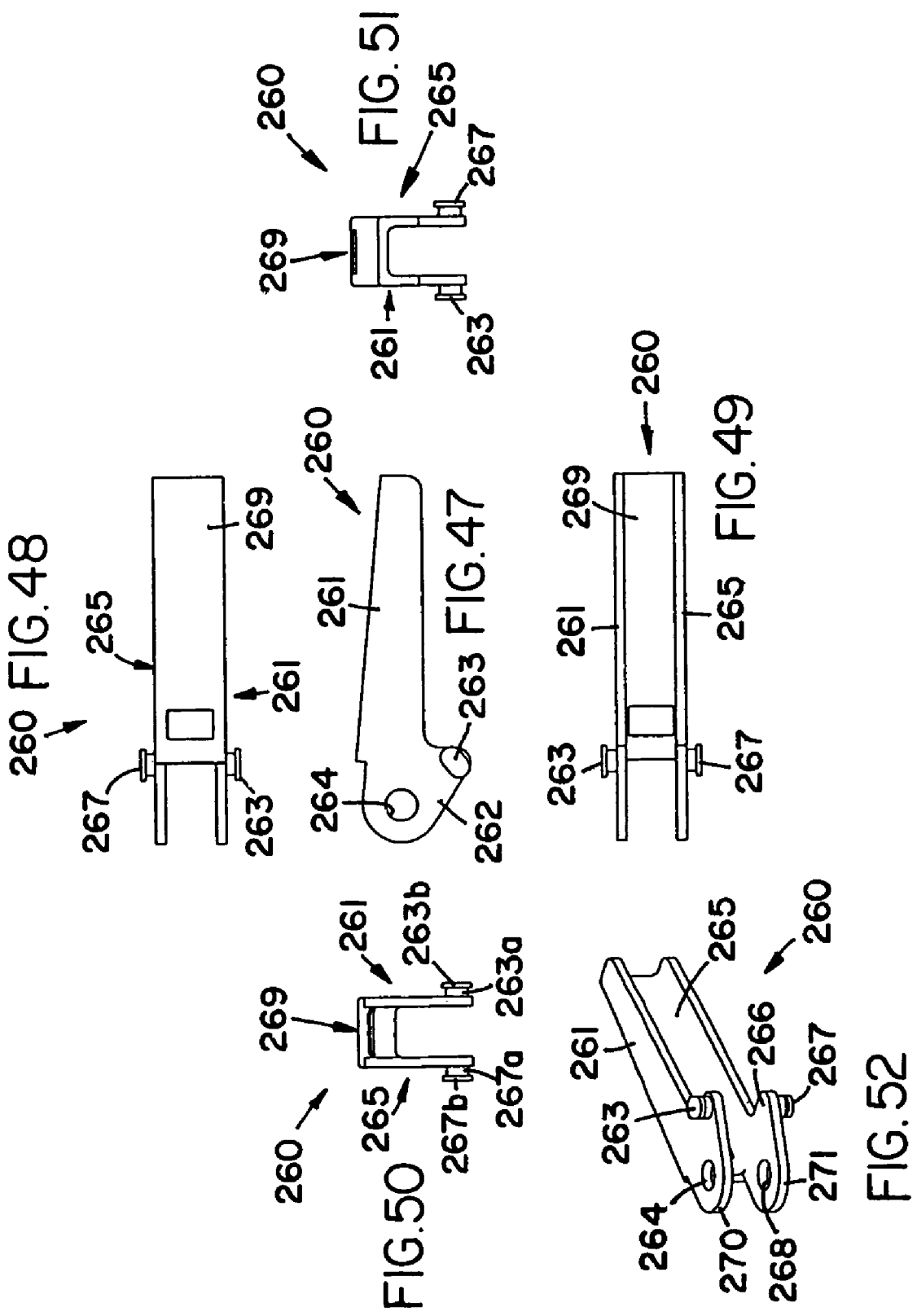

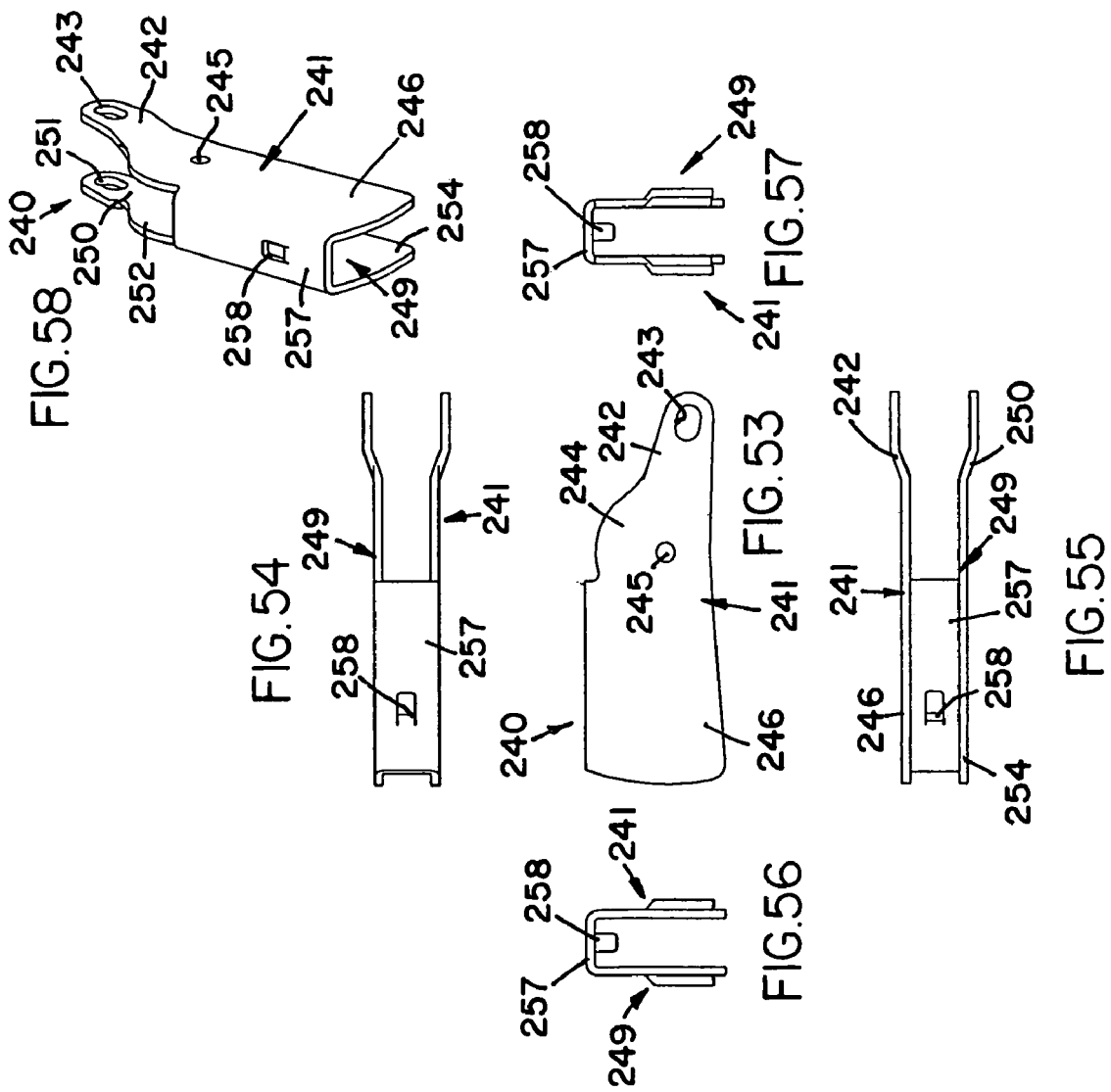

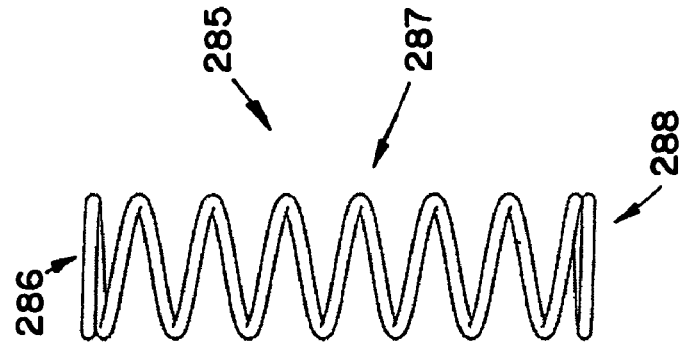
FIG. 62
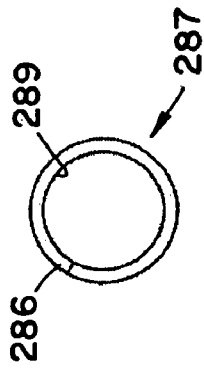
FIG. 63
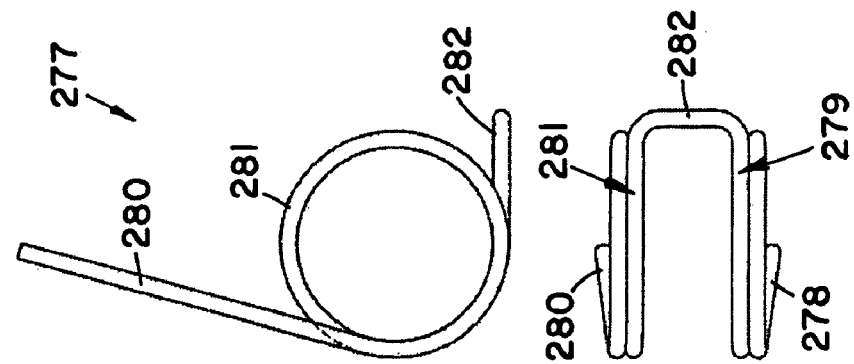
FIG. 59
FIG. 61
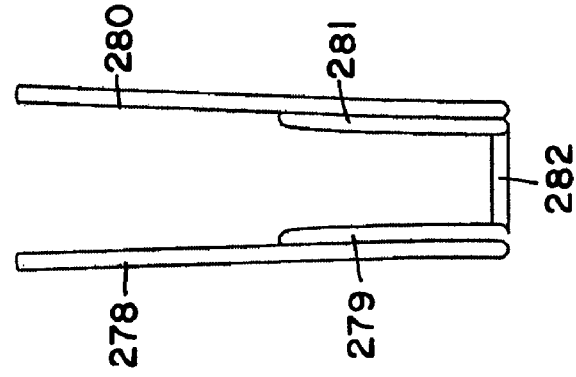
FIG. 60

DOUBLE LOCKING SNAP HOOK

This application claims the benefit of U.S. Provisional Patent Application No. 60/718,844, filed Sep. 20, 2005, and U.S. Provisional Patent Application No. 60/761,721, filed Jan. 24, 2006.

FIELD OF THE INVENTION

The present invention relates to a double locking snap hook for connecting a safety line relative to a load or a person.

BACKGROUND OF THE INVENTION

Double locking snap hooks are commonly used to connect a safety line relative to a load or a person. Typically, the closed loop end is secured to the safety line and the hook end is secured to a support structure. When used in this manner, tension in the safety line sets the hook end against the support structure and the gate portion of the hook end is not required to carry the load on the safety line.

Sometimes, however, users of snap hooks are inclined to wrap the safety line about the support structure and then connect the hook end to an intermediate portion of the safety line. This deviation from recommended operating procedure may cause the safety line to bear against the gate portion of the hook portion and/or may cause the gate portion of the snap hook to bear against the support structure. Under such circumstances, a fall arrest event may impart excessive force on the gate portion resulting in failure of the hook.

SUMMARY OF THE INVENTION

The present invention provides a double locking snap hook having a load bearing gate up to at least 3,600 pounds. In one aspect, a double locking snap hook includes a hook portion, a gate, a lock, and an actuator. The hook portion defines an opening. The gate is pivotally connected to the hook portion and is pivotable to close the opening in the hook portion. The lock is moveably connected to the hook portion. The actuator moves the lock between a closed position and an open position. When in the closed position, the lock reinforces the gate when the opening in the hook portion is closed thereby allowing the gate to withstand a tensile load of up to at least 3,600 pounds.

One aspect of the invention provides a double locking snap hook comprising a hook portion, a gate, a lock, and an actuator. The hook portion defines an opening. The gate is pivotally connected to the hook portion and is pivotable to close the opening in the hook portion. The lock is moveably connected to the hook portion. The actuator is a separate component from the lock and moves the lock between a closed position and an open position. In the closed position, the lock reinforces the gate when the opening in the hook portion is closed thereby allowing the gate to withstand a tensile load of up to at least 3,600 pounds.

Another aspect of the invention provides a double locking snap hook comprising a body, a gate, and a lock. The body has a hook portion, a handle portion, a front, and a rear. The hook portion has a first end, a second end, and an intermediate portion between the first end and the second end. The intermediate portion is proximate the rear and the first and second ends extend from the intermediate portion toward the front. The first and second ends define an opening in the hook portion. The handle portion is operatively connected to the hook portion proximate the second end and the intermediate portion. The gate has a top portion, a bottom portion, and a side. The bottom portion is pivotally connected proximate the second end of the hook portion. The gate is pivotable between a closed position to close the opening in the hook portion and an open position to open the opening in the hook portion. The top portion is proximate the first end when the gate is in the closed position, and the top portion is proximate the intermediate portion when the gate is in the open position. The lock has a third end and a fourth end. The third end is pivotally connected proximate the intermediate portion, and the lock is pivotable between a locked position and an unlocked position. The fourth end is proximate the first end of the hook portion and the top portion and the side of the gate when the lock is in the locked position. The fourth end is proximate the second end of the hook portion when the lock is in the unlocked position. The fourth end of the lock contacts the side of the gate to prevent pivoting of the gate to the open position when the lock is in the locked position. In the locked position, the lock reinforces the gate when the opening in the hook portion is closed thereby allowing the gate to withstand a tensile load of up to at least 3,600 pounds.

Another aspect of the invention provides a double locking snap hook comprising a body, a gate, a lock, and an actuator. The body has a hook portion, a handle portion, a front, and a rear. The hook portion has a first end, a second end, and an intermediate portion between the first end and the second end. The intermediate portion is proximate the rear and the first and second ends extend from the intermediate portion toward the front. The first and second ends define an opening in the hook portion. The handle portion is connected to the hook portion proximate the second end and the intermediate portion. The gate is pivotally connected to the second end of the hook portion and is pivotable to close the opening in the hook portion proximate the first end of the hook portion. The lock is pivotally connected to the intermediate portion of the hook portion. The actuator is a separate component from the lock and pivots the lock between a closed position and an open position by pivoting an opposing end from proximate the first end to proximate the second end of the hook portion. In the closed position, the lock reinforces the gate when the opening in the hook portion is closed thereby allowing the gate to withstand a tensile load of up to at least 3,600 pounds.

Another aspect of the invention provides a double locking snap hook comprising a body, a gate, a lock, and a trigger. The body has a hook portion, a handle portion, a rear, and a front. The hook portion has a first end, a second end, and an intermediate portion between the first end and the second end. The intermediate portion is proximate the rear and the first and second ends extend from the intermediate portion toward the front. The first and second ends define an opening in the hook portion. The handle portion is connected to the hook portion proximate the second end and the intermediate portion. The gate has a third end and a fourth end. The fourth end is pivotally connected to the second end to pivot the gate between a closed position and an open position. The third end is proximate the first end in the closed position, and the third end is proximate the intermediate portion in the open position. The gate is pivotable from proximate the first end to proximate the intermediate portion to open and close the opening in the hook portion. The lock has a fifth end and a sixth end. The sixth end is pivotally connected to the intermediate portion to pivot the lock between a locked position and an unlocked position. The fifth end is proximate the first end in the locked position and proximate the second end in the unlocked position. The locked position prevents the gate from pivoting into the open position, and the unlocked position allows the gate to pivot into the open position. In the closed position, the lock reinforces the gate to withstand a tensile load of up to at least 3,600 pounds. The trigger is pivotally connected to the intermediate portion and to the lock, wherein pivoting the trigger relative to the hook portion pivots the lock from the locked position to the unlocked position.

BRIEF DESCRIPTION OF THE DRAWINGS

FIG. 5 is a side view of the double locking snap hook shown in FIG. 1 with the gate, the trigger, and the lock removed;

FIG. 6 is a rear view of the double locking snap hook shown in FIG. 5;

FIG. 7 is a side view of a gate of the double locking snap hook shown in FIG. 1;

FIG. 8 is a rear view of the gate shown in FIG. 7;

FIG. 9 is a side view of the opposite side of the gate shown in FIG. 7;

FIG. 10 is a top view of the gate shown in FIG. 7;

FIG. 11 is a front perspective view of the gate shown in FIG. 7;

FIG. 12 is a side view of a trigger of the double locking snap hook shown in FIG. 1;

FIG. 13 is a rear view of the trigger shown in FIG. 12;

FIG. 14 is a bottom view of the trigger shown in FIG. 12;

FIG. 15 is a front perspective view of the trigger shown in FIG. 12;

FIG. 16 is a front view of the trigger shown in FIG. 12;

FIG. 17 is a side view of the opposite side of the trigger shown in FIG. 12;

FIG. 18 is a front view of a lock of the double locking snap hook shown in FIG. 1;

FIG. 19 is a cross section of the lock taken along the lines 19-19 in FIG. 18;

FIG. 20 is a side view of the lock shown in FIG. 18;

FIG. 21 is a front view of a thumb pad of the double locking snap hook shown in FIG. 1;

FIG. 22 is a side view of the thumb pad shown in FIG. 21;

FIG. 23 is a front view of a torsion spring of the double locking snap hook shown in FIG. 1;

FIG. 24 is a side view of the torsion spring shown in FIG. 23;

FIG. 25 is a bottom view of the torsion spring shown in FIG. 23;

FIG. 26 is a side view of a compression spring of the double locking snap hook shown in FIG. 1;

FIG. 27 is a top view of the compression spring shown in FIG. 26;

FIG. 29 is a side view of the double locking snap hook shown in FIG. 28;

FIG. 30 is a side view of the double locking snap hook shown in FIG. 28 with the gate removed;

FIG. 31 is a side view of another embodiment double locking snap hook constructed according to the principles of the present invention in a locked position;

FIG. 32 is a cross-section side view of the double locking snap hook shown in FIG. 31;

FIG. 35 is a side view of a body of the double locking snap hook shown in FIG. 31;

FIG. 36 is a top view of the body shown in FIG. 35;

FIG. 37 is a bottom view of the body shown in FIG. 35;

FIG. 38 is a rear view of the body shown in FIG. 35;

FIG. 39 is a front view of the body shown in FIG. 35;

FIG. 40 is a perspective view of the body shown in FIG. 35;

FIG. 41 is a side view of a gate of the double locking snap hook shown in FIG. 31;

FIG. 42 is a top view of the gate shown in FIG. 41;

FIG. 43 is a bottom view of the gate shown in FIG. 41;

FIG. 44 is a rear view of the gate shown in FIG. 41;

FIG. 45 is a front view of the gate shown in FIG. 41;

FIG. 46 is a perspective view of the gate shown in FIG. 41;

FIG. 47 is a side view of a lock of the double locking snap hook shown in FIG. 31;

FIG. 48 is a top view of the lock shown in FIG. 47;

FIG. 49 is a bottom view of the lock shown in FIG. 47;

FIG. 50 is a rear view of the lock shown in FIG. 47;

FIG. 51 is a front view of the lock shown in FIG. 47;

FIG. 52 is a perspective view of the lock shown in FIG. 47;

FIG. 53 is a side view of a trigger of the double locking snap hook shown in FIG. 31;

FIG. 54 is a top view of the trigger shown in FIG. 53;

FIG. 55 is a bottom view of the trigger shown in FIG. 53;

FIG. 56 is a rear view of the trigger shown in FIG. 53;

FIG. 57 is a front view of the trigger shown in FIG. 53;

FIG. 58 is a perspective view of the trigger shown in FIG. 53;

FIG. 59 is a side view of a torsion spring of the double locking snap hook shown in FIG. 31;

FIG. 60 is a front view of the torsion spring shown in FIG. 59;

FIG. 61 is a bottom view of the torsion spring shown in FIG. 59;

FIG. 62 is a side view of a helical coil spring of the double locking snap hook shown in FIG. 31;

FIG. 63 is a top view of the helical coil spring shown in FIG. 62;

DETAILED DESCRIPTION OF A PREFERRED EMBODIMENT

Figure 1:
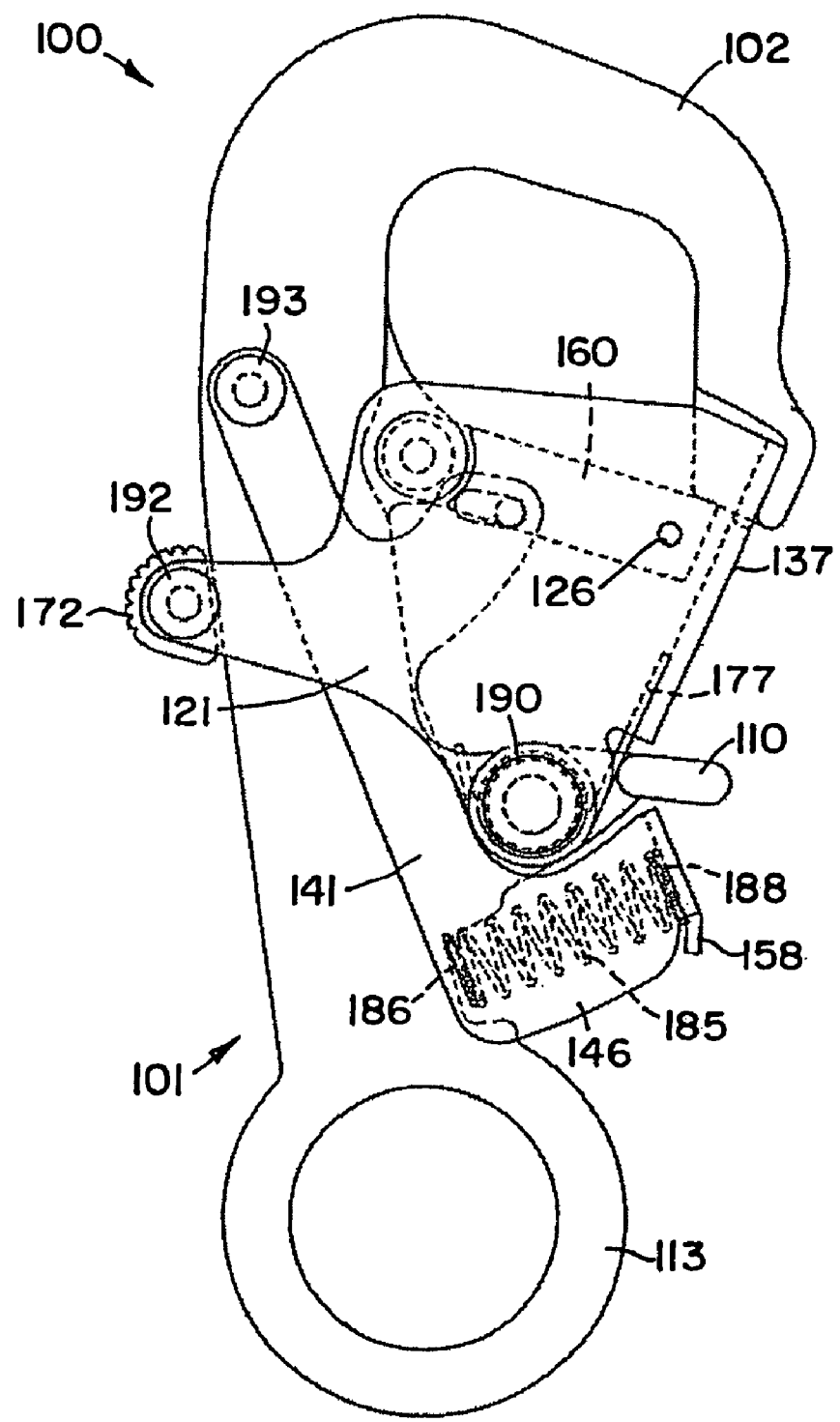
FIG. 1 is a side view of a double locking snap hook constructed according to the principles of the present invention in a locked position with hidden lines representing the double locking snap hook's internal components.

One embodiment double locking snap hook constructed according to the principles of the present invention is designated by the numeral 100 in the drawings, another embodiment double locking snap hook constructed according to the principles of the present invention is designated by the numeral 200 in the drawings, and another embodiment double locking snap hook constructed according to the principles of the present invention is designated by the numeral 300 in the drawings. Those skilled in the art will recognize that the double locking snap hooks 100, 200, and 300 may be used for a variety of purposes and/or in a variety of situations.

For example, U.S. Pat. Nos. 4,657,110; 5,174,410; and 5,687,535 show some possible applications for the double locking snap hooks 100, 200, and 300.

The double locking snap hook 100 generally includes a body 101, a gate 120, a trigger 140, and a lock 160. The body 101 is preferably an integral component including a hook portion 102 and a handle portion 112. As shown in FIGS. 5 and 6, the hook portion 102 extends upward from the handle portion 112 forming an upside down J-shaped hook terminating at an end 103 and defining an opening 105 between the base of the hook portion 102 and the end 103. The end 103 includes a recessed portion 104 on each side of the hook portion 102 proximate the opening 105. A flange 106 extends outward from an inner surface of the hook portion 102 opposite the end 103 and toward the end 103. The flange 106 includes an aperture 107. An aperture 108 extends through the hook portion 102 proximate the flange 106.

Proximate the juncture of the hook portion 102 and the handle portion 112, below the flange 106, is a protrusion 109 extending outward from the body 101. Proximate the end of the protrusion 109 is a ledge 110. The ledge 110 and the end 103 of the hook portion 102 define an opening 116. The protrusion 109 includes an aperture 111 proximate the ledge 110. The end of the handle portion 112 includes an eyelet portion 113 with an aperture 114. The aperture 114 extends through the handle portion 112 to facilitate connection of the double locking snap hook 100 to any of various elements including a support structure, a lanyard, or a fall arrest device for example. Between the eyelet portion 113 and the protrusion 109 is a notch 115 in the handle portion 112. The notch 115 is provided to accommodate a first end 186 of a helical coil spring 185 and a portion of the trigger 140. The helical coil spring 185 is shown in FIGS. 26 and 27.

Figure 4:
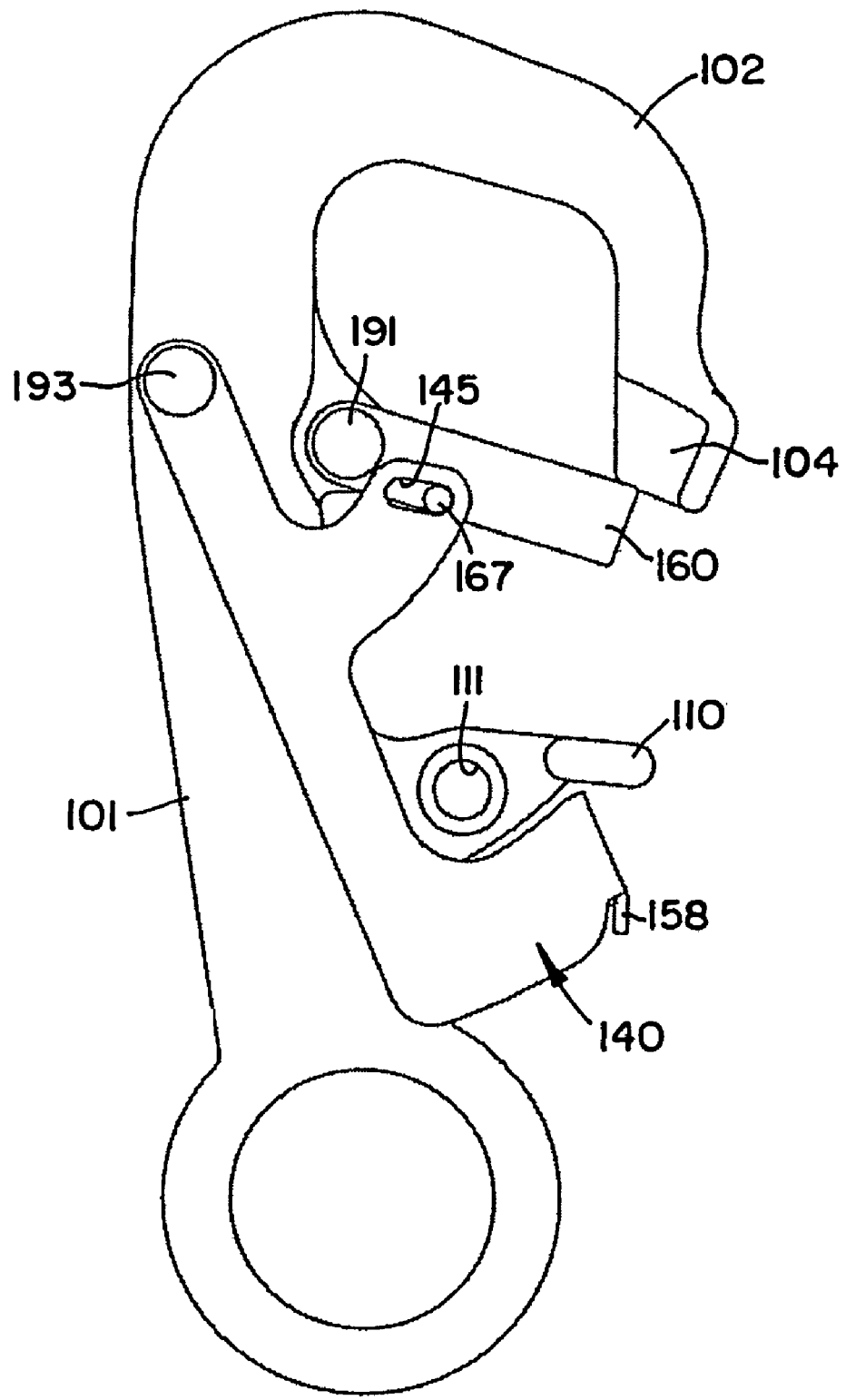
FIG. 4 is a side view of the double locking snap hook shown in FIG. 1 with the gate removed.

The lock 160, as shown in FIGS. 18-20, includes a base 169 and a first tine 162 having a first aperture 163 and a second tine 164 having a second aperture 165 extending upward from a top 161 of the base 169. Preferably, the base 169 has a rectangular cross section. The tines 162 and 164 define an opening 166 therebetween. The apertures 163 and 165 are aligned and extend laterally through the tines 162 and 164. A first bar 167 and a second bar 168 extend outward laterally from each side of the base 169 proximate a middle portion and a bottom edge of the lock 160. The opening 166 accommodates the flange 106 of the body 101, and the apertures 163 and 165 correspond with the aperture 107. A rivet 191 extends through the apertures 163, 107, and 165 to secure the lock 160 to the flange 106. This is shown in FIG. 4.

The trigger 140, which is an actuator, is shown in FIGS. 12-17. The trigger 140 includes a third side 157 interconnecting a first side 141 and a second side 149. The first side 141 includes an elongate portion 141*a* having a top portion 142 with an aperture 143. A protrusion 144 having a slot 145 extends outward from a middle portion of the elongate portion 141*a* and curves in an upward direction therefrom. The slot 145 extends generally laterally relative to the longitudinal axis of the protrusion 144. The bottom 146 of the first side 141 extends outward from the elongate portion 141*a* at a right angle therefrom. As shown in FIGS. 12 and 17, the second side 149 is a mirror image of the first side 141. The second side 149 includes an elongate portion 149*a* having a top portion 150 with an aperture 151. A protrusion 152 having a slot 153 extends outward from a middle portion of the elongate portion 149*a* and curves in an upward direction therefrom. The slot 153 extends generally laterally relative to the longitudinal axis of the protrusion 152. The bottom 154 of the second side 149 extends outward from the elongate portion 149*a* at a right angle therefrom.

The third side 157 interconnects the bottom 146 of the first side 141 and the bottom 154 of the second side 149 generally parallel to the longitudinal axis of the elongate portions 141*a* and 149*a*. A protrusion 158 extends downward from the third side 157 and is angled inward toward the bottoms 146 and 154.

The apertures 143 and 151 align and correspond with aperture 108 of the body 101. A rivet 193 extends through the apertures 143, 108, and 151 to secure the trigger 140 to the body 101. The first bar 167 of the lock 160 extends through the slot 145 and is slidable therein, and the second bar 168 of the lock 160 extend through the slot 153 and is slidable therein. As shown in FIG. 13, the first side 141 and the second side 149 curve outward away from one another proximate the third side 157. The first side 141 includes a first curve 147 and the second side 149 includes a second curve 155 that form a cavity 159 in which the second end 188 of the helical coil spring 185 is placed. The third side 157 provides a surface upon which the helical coil spring 185 exerts pressure because the coiled portion 187 is compressed between the handle portion 112 within the notch 115 and the third side 157 and continually biases the third side 157 away from the handle portion 112. The helical coil spring 185 may be described as means for biasing the trigger 140 toward a closed position relative to the handle portion 112. The protrusion 158 helps keep the helical coil spring 185 within the cavity 159. The helical coil spring 185 is preferably made of stainless steel spring wire having a diameter of 0.032 inch and a spring rate of approximately 3.96 to 4.84 pounds per inch. The outside diameter of the spring 185 is preferably 0.355 to 0.365 inch, and the height of the spring 185 is preferably 0.330 inch maximum. The trigger 140 actuates the lock 160. The trigger 140 pivots about the rivet 193, the lock 160 pivots about the rivet 191, and the bars 167 and 168 slide within the slots 145 and 153.

As shown in FIGS. 7-11, the gate 120 includes a third side 137 interconnecting a first side 121 and a second side 129. The first side 121 is generally rectangular and includes a protrusion 122 proximate the lower left corner with an aperture 123 proximate the end of the protrusion 122. A protrusion 124 extends downward proximate the bottom with an aperture 125 proximate the right side of the first side 121. An inspection aperture 126 is proximate the top right corner. As shown in FIGS. 7 and 9, the second side 129 is a mirror image of the first side 121. The second side 129 is generally rectangular and includes a protrusion 130 proximate the lower right corner with an aperture 131 proximate the end of the protrusion 130. A protrusion 132 extends downward proximate the bottom with an aperture 133 proximate the left side of the second side 129. An inspection aperture 134 is proximate the top left corner. The third side 137 interconnects the right side of the first side 121 and the left side of the second side 129 as shown in FIGS. 8, 10, and 11. A notch 138 in the top of the third side 137 receives the recessed portion 104 of the end 103 of the body 101.

As shown in FIGS. 23-25, a torsion spring 177 includes a first end 178 extending from a first loop 179 and a second end 180 extending from a second loop 181. A middle portion 182 interconnects the first loop 179 and the second loop 181. The first end 178 and the second end 180 extend upward from the loops 179 and 181 at preferably less than a right angle from where the middle portion 182 interconnects the loops 179 and 181. The torsion spring 177 is preferably made of stainless steel spring wire having a diameter of 0.040 inch. The inside diameter of the loops 179 and 181 is 0.480 inch.

The middle portion 182 straddles the protrusion 109, and the loops 179 and 181 correspond with the aperture 111 on each side of the body 101. The ends 178 and 180 extend upward proximate the ledge 110. The apertures 125 and 133 of the gate 120 align and correspond with the aperture 111 of the body 101. The ends 178 and 180 extend upward between the sides 121 and 129 of the gate 120 and continually bias the third side 137 away from the handle portion 112. The torsion spring 177 may be described as means for biasing the gate 120 toward a closed position relative to the hook portion 102. A rivet 190 extends through the apertures 125, 111, and 133 and the loops 179 and 181 to secure the gate 120 and the torsion spring 177 to the body 101.

A thumb pad 172, as shown in FIGS. 21 and 22, is generally D-shaped and includes a ribbed surface 174 on the curved portion of the thumb pad 172. An aperture 173 extends through the center of the "D". The thumb pad 172 is placed between the protrusions 122 and 130, with the ribbed surface 174 exposed proximate the end of the protrusions 122 and 130, and the aperture 173 corresponds with apertures 123 and 131. A rivet 192 secures the thumb pad 172 to the gate 120 proximate the outer surface of the body 101.

Figure 3:
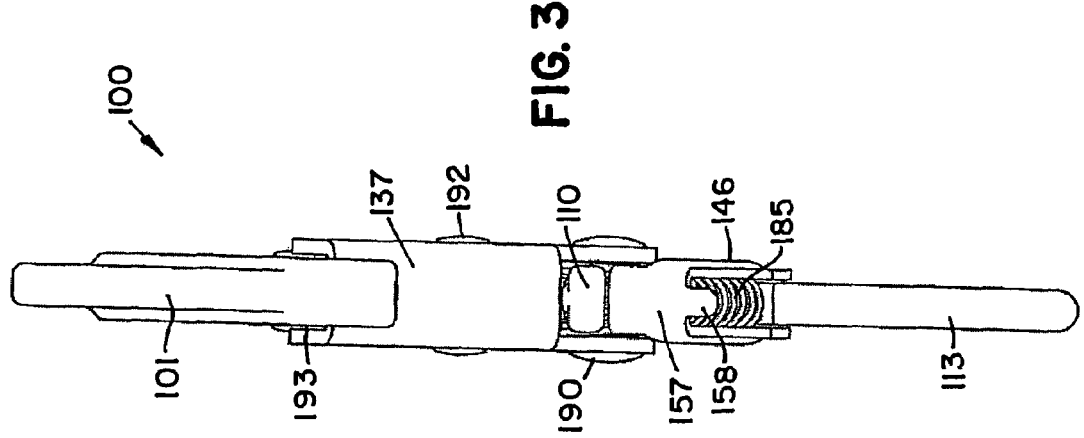
FIG. 3 is a front view of the double locking snap hook shown in FIG. 2.
Figure 2:
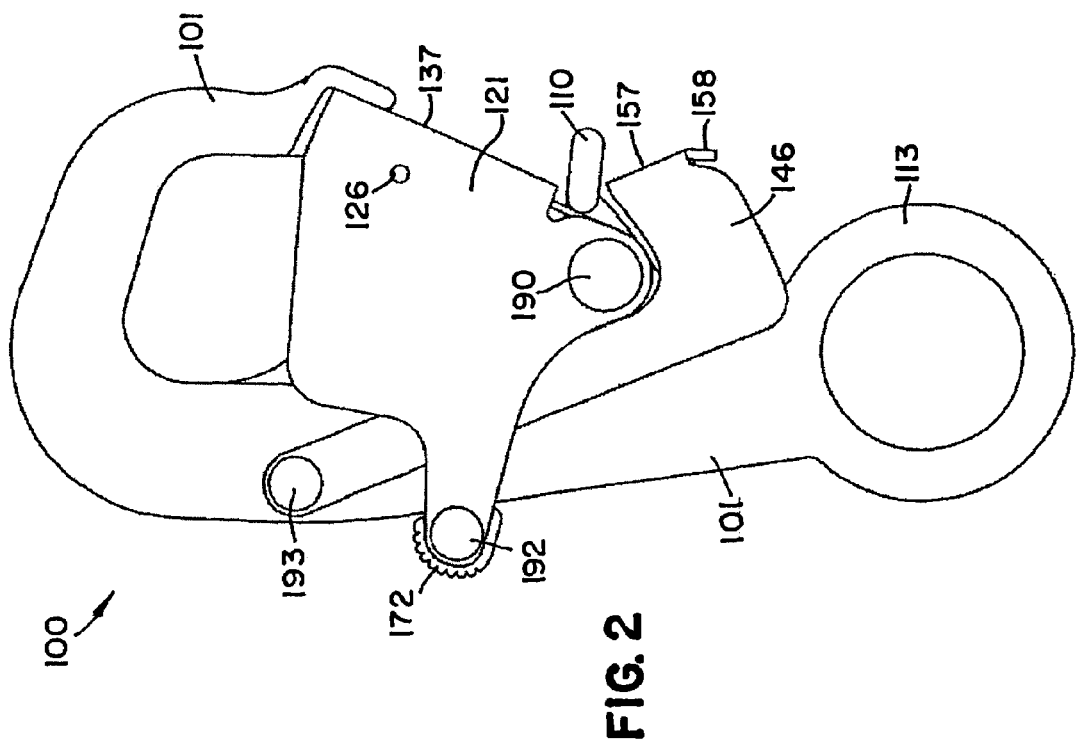
FIG. 2 is a side view of the double locking snap hook shown in FIG. 1.

In operation, the double locking snap hook 100 is continually biased by springs 177 and 185 to be in the locked position, as shown in FIGS. 1-3. To unlock the double locking snap hook 100, the helical coil spring 185 is compressed by pulling the third side 157 of the trigger 140 toward the handle portion 112 and the trigger 140 pivots backward toward the handle portion 112 about rivet 193, as shown in FIG. 30. This is preferably accomplished by squeezing the third side 157 of the trigger 140 against the handle portion 112. The lock 160 is actuated by the trigger 140. The lock 160 is caused to pivot downward from a closed position to an open position about rivet 191 by the interaction of the slots 145 and 153 of the trigger 140 and the bars 167 and 168 of the lock 160. As the trigger 140 is pivoted, the slots 145 and 153 push on the sides of the bars 167 and 168 while guiding the bars 167 and 168 from the front to the back of the slots 145 and 153 thereby causing the lock 160 to pivot downward from the end 103 toward the protrusion 109. This is shown in FIG. 30.

When the lock 160 is in the closed, locked position, the trigger 140 and the lock 160 interfere with the opening of the gate 120. In the closed, locked position, one end of the lock 160 is pivotally connected to the hook portion 102 and the opposing end of the lock 160 is biased to extend proximate the end 103 and the top of the gate 120. The lock 160 extends in the general direction in which the gate 120 is pressed to pivot the gate 120 to open the opening 105. When force is exerted against the gate 120, the third side 137 of the gate 120 contacts the opposing end of the lock 160, and the lock 160 prevents the gate 120 from being further pivoted inward toward the hook portion 102. Not only does the lock 160 prevent the gate 120 from pivoting to open the opening 105, but the lock 160 acts as a compression member between the body 101 and the gate 120 to reinforce and strengthen the gate 120.

Figure 28:
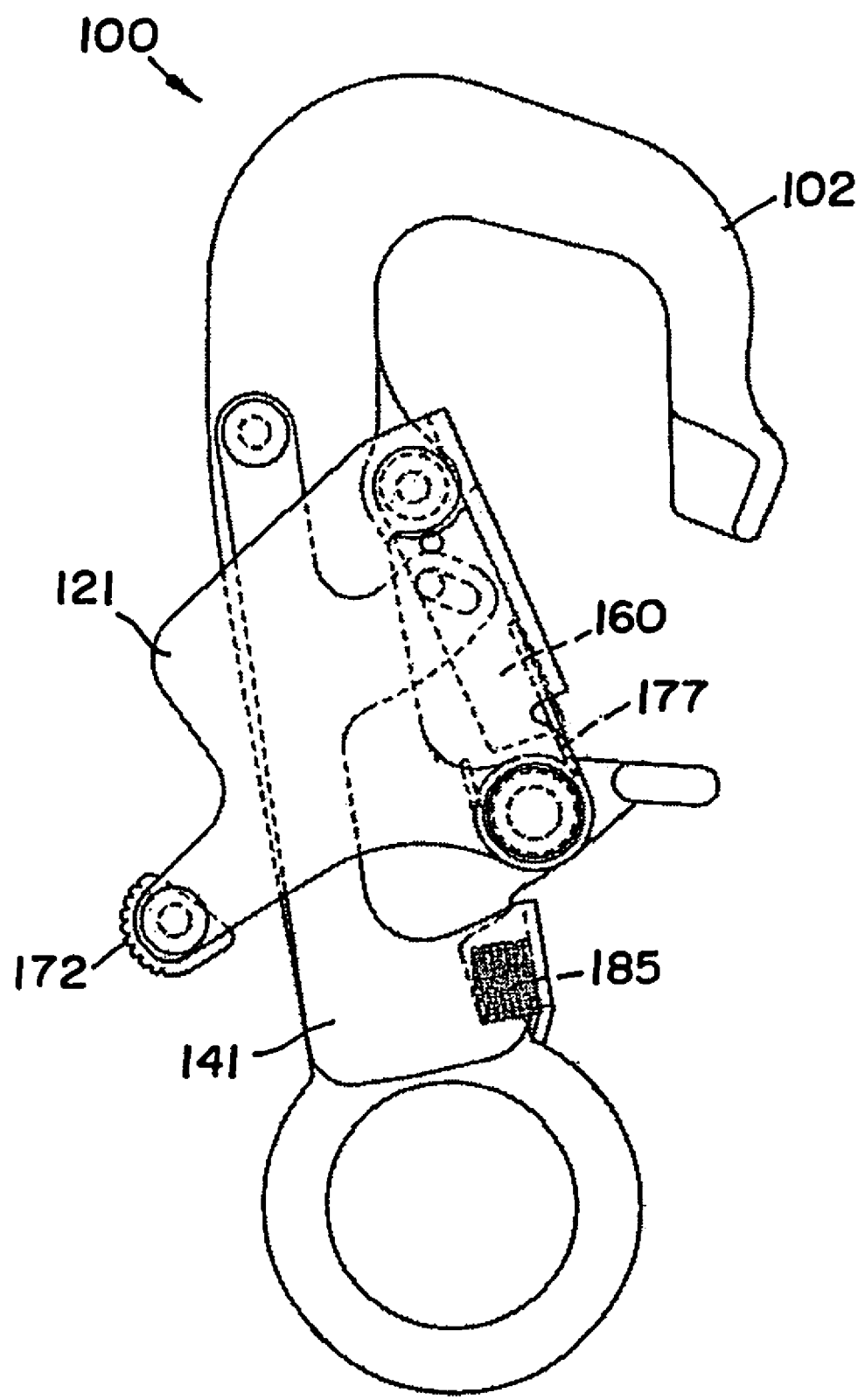
FIG. 28 is a side view of the double locking snap hook shown in FIG. 1 in an unlocked position with hidden lines representing the double locking snap hook's internal components.

The gate 120 may then be pivoted about rivet 190 by pulling the thumb pad 172 downward, preferably using one's thumb, which opens the gate 120 and allows access to the openings 105 and 116. This is shown in FIGS. 28 and 29. When the hook portion 102 engages an object, the gate 120 is then released, and the torsion spring 177 causes the gate 120 to close. The gate is closed when the notch 138 slides about the recessed portion 104 to close the openings 105 and 116. The trigger 140 may be released any time after the gate 120 is opened because the opened gate 120 will hold the trigger 140 in an open position. Once the gate 120 has been released and is biased toward the closed position, and the helical coil spring 185 will bias the trigger 140 toward the closed position. The lock 160 will swing into the closed position as the trigger 140 is biased toward the closed position, and the lock 160 reinforces the gate 120 in the closed position. The reinforced gate 120 is able to withstand a tensile load of up to at least 3,600 pounds.

The inspection apertures 126 and 134 are optional and are used to determine if the lock 160 is positioned correctly. When properly locked, no light can be seen through the inspection apertures 126 and 134 because the lock 160 is in alignment with the inspection apertures 126 and 134. If the lock 160 is not positioned correctly, and not properly locked, the lock 160 does not align with the inspection apertures 126 and 134 and allows light to be seen therethrough.

The double locking snap hook 200 generally includes a body 201, a gate 220, a trigger 240, and a lock 260. The body 201 is preferably an integral component including a hook portion 202 and a handle portion 212. As shown in FIGS. 35-40, the hook portion 202 extends upward from the handle portion 212 forming an upside down J-shaped hook terminating at an end 203 and defining an opening 205 between the base of the hook portion 202 and the end 203. The end 203 includes a recessed portion 204 on each side of the hook portion 202 proximate the opening 205. A bump 206 extends outward from an inner surface of the hook portion 202 opposite the end 203 and toward the end 203. Proximate the bump 206 is an aperture 207. The hook portion 202 includes a bulge 216 extending outward from an outer surface of the hook portion 202 proximate the juncture of the hook portion 202 and the handle portion 212. An aperture 208 extends through the handle portion 212 proximate below the bulge 216.

The end of the handle portion 212 includes an eyelet portion 213 with an aperture 214. The aperture 214 extends through the handle portion 212 to facilitate connection of the double locking snap hook 200 to any of various elements including a support structure, a lanyard, or a fall arrest device for example. Proximate above the eyelet portion 213 below the opening 205 is a protrusion 209 extending outward from the inner surface of the body 201. The protrusion 209 includes a cylindrical member 210 having an aperture 211. The cylindrical member 210 extends outward from each side of the protrusion 209. On the other side of the body 201 from the protrusion 209, on the outer surface of the body 201, is a notch 215 extending inward in the handle portion 212. The notch 215 is provided to accommodate a first end 286 of a helical coil spring 285 positioned between the handle portion 212 and the trigger 240. The helical coil spring 285 is shown in FIGS. 62 and 63.

The lock 260, as shown in FIGS. 47-52, includes a first side 261 and a second side 265 interconnected by a third side 269. The first side 261 and the second side 265 are preferably identical and parallel to one another with the third side 269 interconnecting the top edges of the sides 261 and 265. The first side 261 is a generally rectangular plate member having a rounded end 270 with an aperture 264 and a protrusion 262 extending downward from the rounded end 270. A tine 263 extends outward from the protrusion 262. The second side 265 is a generally rectangular plate member having a rounded end 271 with an aperture 268 and a protrusion 266 extending downward from the rounded end 271. A tine 267 extends outward from the protrusion 266. The apertures 264 and 268 are in alignment with one another and with aperture 207 of the body 201, and the tines 263 and 267 are in alignment with one another. As shown in FIG. 50, the tines 263 and 267 preferably include cylindrical extensions 263*a* and 267*a* with one end secured to the respective sides of the lock 260 and oval-shaped flanges 263*b* and 267*b* secured to the other end of the extensions 263*a* and 267*a*. The tines 263 and 267 may be investment cast as is well known in the art. A rivet (not shown) extends through the apertures 264, 207, and 267 to secure the lock 260 to the body 201.

The trigger 240, which is an actuator, is shown in FIGS. 53-58. The trigger 240 includes a third side 257 interconnecting a first side 241 and a second side 249. The first side 241 and the second side 249 are preferably identical and parallel to one another. The first side 241 includes a generally rectangular bottom portion 246 and a top portion 242 interconnected with a rounded portion 244. The top portion 242 is tapered toward the inner side edge and includes a slot 243, which is preferably an oval-shaped aperture, proximate the end. The rounded portion 244 includes an aperture 245. The second side 249 includes a generally rectangular bottom portion 254 and a top portion 250 interconnected with a rounded portion 252. The top portion 250 is tapered toward the inner side edge and includes a slot 251, which is preferably an oval-shaped aperture, proximate the end. The rounded portion 252 includes an aperture 253. The third side 257 is a generally rectangular plate member interconnecting the outer side edges of the bottom portions 246 and 254. The third side 257 includes a tab 258 extending downward between the first side 241 and the second side 249 proximate the bottom portions 246 and 254.

The apertures 245 and 253 are in alignment with one another and with aperture 208 of the body 201, and the slots 243 and 251 are in alignment with one another and with the tines 263 and 267. The flanges 263b and 267b prevent the slots 243 and 251 from disengaging the tines 263 and 267. A rivet (not shown) extends through apertures 245, 208, and 253 to secure the trigger 240 to the body 201. The tines 263 and 267 extend through the slots 243 and 251, respectively, and are slidable therein.

Figure 34:
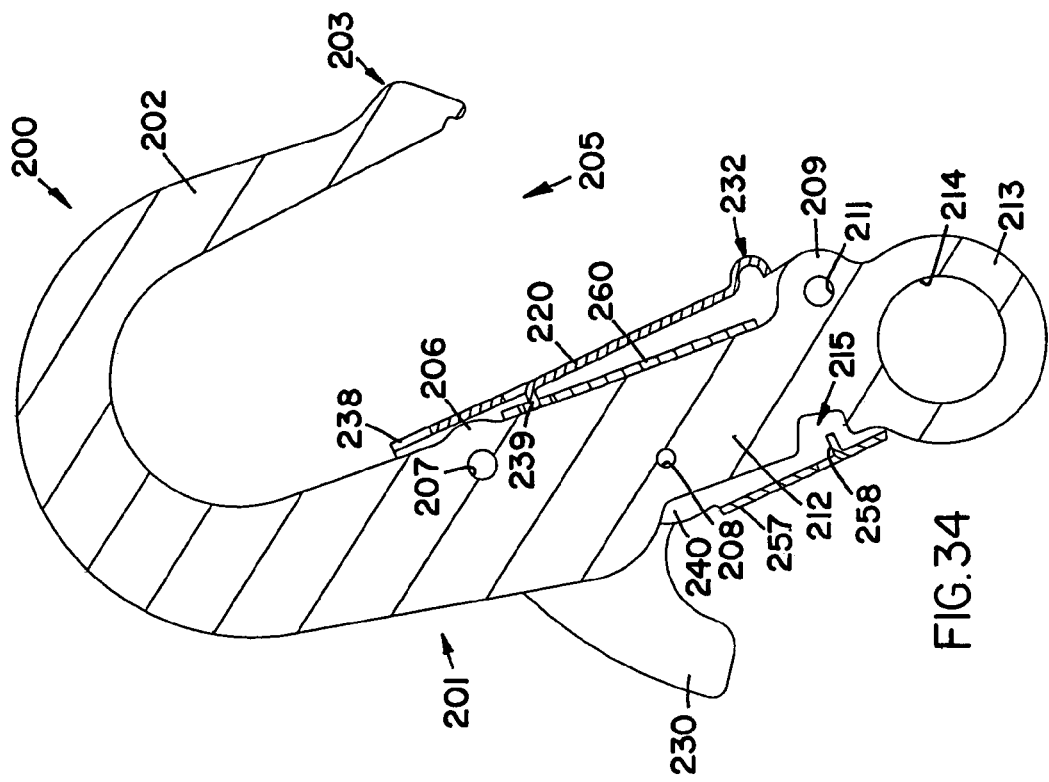
FIG. 34 is a cross-section side view of the double locking snap hook shown in FIG. 33.

As shown in FIG. 32, the first end 286 of the helical coil spring 285 is positioned within the notch 215 and the tab 258 is positioned within the bore 289 of the second end 288 to keep the helical coil spring 285 positioned between the handle portion 212 and the trigger 240. The third side 257 provides a surface upon which the helical coil spring 285 exerts pressure because the coiled portion 287 is compressed between the handle portion 212 within the notch 215 and the third side 257 and continually biases the third side 257 away from the handle portion 212. The helical coil spring 285 may be described as means for biasing the trigger 240 toward a closed position relative to the handle portion 212. The helical coil spring 285 is preferably made of stainless steel spring wire having a diameter of 0.032 inch and a spring rate of approximately 3.96 to 4.84 pounds per inch. The outside diameter of the spring 285 is preferably 0.355 to 0.365 inch, and the height of the spring 285 is preferably 0.330 inch maximum. The trigger 240 actuates the lock 260. When the bottom portions 246 and 254 of the trigger 240 are pressed inward toward the handle portion 212, the helical coil spring 285 is compressed, the trigger 240 pivots about the rivet extending through the apertures 245, 208, and 253, and the top portions 242 and 250 pivot outward. The tines 263 and 267 slide within the slots 243 and 251, respectively, which causes the lock 260 to pivot about the rivet extending through apertures 264, 207, and 267 in a downward direction. This is shown in FIG. 34.

As shown in FIGS. 41-46, the gate 220 includes a third side 237 interconnecting a first side 221 and a second side 229. The first side 221 and the second side 229 are preferably identical and parallel to one another with the third side 237 interconnecting them proximate the right side of the gate 220. As shown in FIG. 41, the first side 221 is generally triangular with a protrusion 222 extending outward from the upper left vertex and an aperture 225 proximate the bottom vertex. A protrusion 224 extends outward proximate the aperture 225 and the lower right side of the gate 220. The second side 229 is also generally triangular with a protrusion 230 extending outward from the upper left vertex and an aperture 233 proximate the bottom vertex. A protrusion 232 extends outward proximate the aperture 233 and the lower right side of the gate 220. The third side 237 includes a notch 238 in the top of the third side 237 and a tab 239 proximate below the notch 238 extends inward between the sides 221 and 229. The notch 238 receives the recessed portion 204 of the end 203 of the body 201. The tab 239 acts as a stop member for the end of the lock 260 so that the lock 260 does not pivot upward too far thus preventing the helical coil spring 285 from extending too far. The apertures 225 and 233 are in alignment with one another and with the aperture 211 of the body 201. A rivet (not shown) extends through the apertures 225, 211, and 233 to operatively connect the gate to the body 201.

As shown in FIGS. 59-61, a torsion spring 277 includes a first end 278 extending from a first loop 279 and a second end 280 extending from a second loop 281. A middle portion 282 interconnects the first loop 279 and the second loop 281. The first end 278 and the second end 280 extend upward from the loops 279 and 281 at preferably less than a right angle from where the middle portion 282 interconnects the loops 279 and 281. The torsion spring 277 is preferably made of stainless steel spring wire having a diameter of 0.040 inch. The inside diameter of the loops 279 and 281 is 0.480 inch.

The middle portion 282 of the torsion spring 277 straddles the upper portion of the protrusion 209 of the body 201, and the loops 279 and 281 correspond with the aperture 211 on each side of the body 201. The ends 278 and 280 exert pressure upon the third side 237 of the gate 220 and continually bias the third side 237 away from the handle portion 212 thereby urging the third side 237 toward the hook portion 202. The torsion spring 277 may be described as means for biasing the gate 220 toward a closed position relative to the hook portion 202. A rivet (not shown) extends through the apertures 225, 211, and 233 and the loops 279 and 281 to secure the gate 220 and the torsion spring 277 to the body 201.

Figure 33:
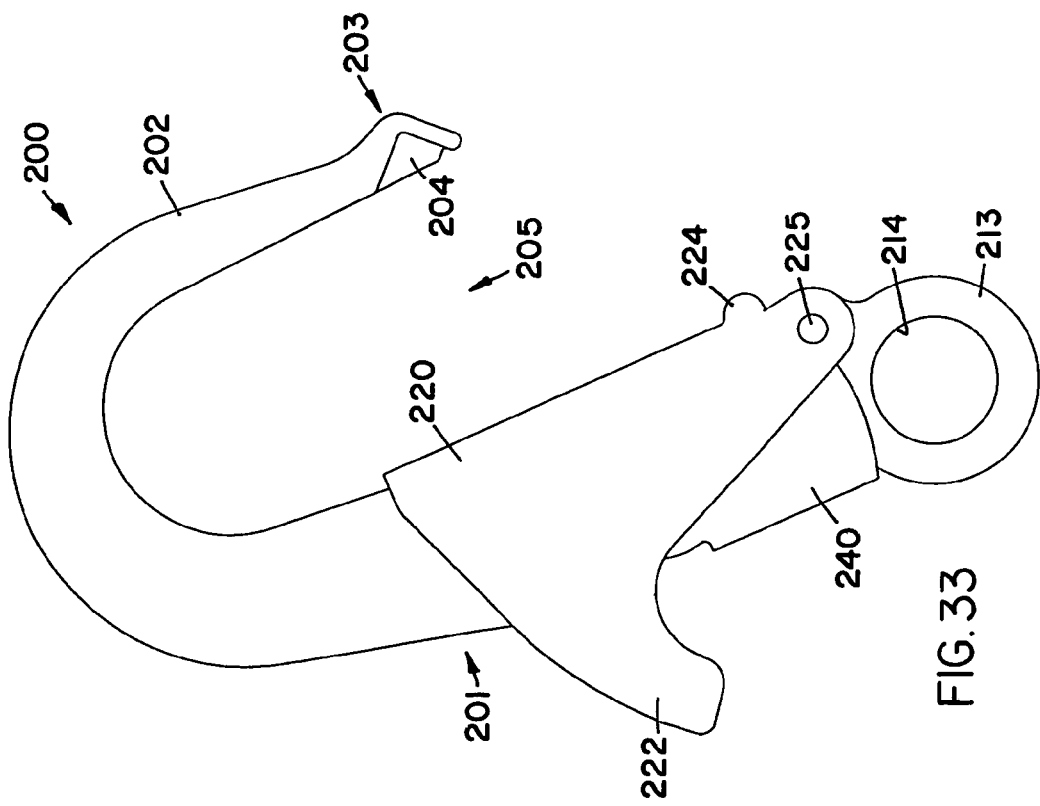
FIG. 33 is a side view of the double locking snap hook shown in FIG. 31 in an unlocked position.

In operation, the double locking snap hook 200 is continually biased by springs 277 and 285 to be in the locked position, as shown in FIGS. 31 and 32. To position the double locking snap hook 200 in an unlocked position, as shown in FIGS. 33 and 34, the bottom portions 246 and 254 of the trigger 240 are pressed inward toward the handle portion 212, the helical coil spring 285 is compressed, the trigger 240 pivots about the rivet extending through the apertures 245, 208, and 253, and the top portions 242 and 250 pivot outward. The tines 263 and 267 slide within the slots 243 and 251, respectively, which causes the lock 260 to pivot about the rivet extending through apertures 264, 207, and 267 in a downward direction. The lock 260 is actuated by the trigger 240. The lock 260 is caused to pivot downward from a closed, locked position to an open, unlocked position about the rivet by the interaction of the slots 243 and 251 of the trigger 240 and the tines 263 and 267 of the lock 260. As the trigger 240 is thus pivoted and the slots 243 and 251 guide the tines 263 and 267 thereby causing the lock 260 to pivot downward. When the lock 260 is pivoted downward away from the tab 239, the gate 220 is no longer locked by the lock 260. Preferably, the surface of the lock 260 proximate the tab 239 is rounded to provide clearance between the lock 260 and the gate 220 to assist in pivoting the lock 260. The third side 237 of the gate 220 may then be pushed inward, pivoting about a rivet (not shown) extending through apertures 225, 211, and 233 thus providing access to the opening 205. Preferably, there is a space between the top of the recessed portion 204 and the gate 220 to provide clearance between the top of the recessed portion and the gate 220 to assist in pivoting the gate 220.

When the hook portion 202 engages an object, the gate 220 is then released, and the torsion spring 277 causes the gate 220 to close. The gate 220 is closed when the notch 238 slides about the recessed portion 204 to close the opening 205. The trigger 240 may be released any time after the gate 220 is opened because the opened gate 220 will hold the trigger 240 in an open position. Once the gate 220 has been released and is biased toward the closed position, and the helical coil spring 285 will bias the trigger 240 toward the closed position. The lock 260 will swing into the closed position as the trigger 240 is biased toward the closed position, and the lock 260 reinforces the gate 220 in the closed position. The reinforced gate 220 is able to withstand a tensile load of up to at least 3,600 pounds.

Figure 64:
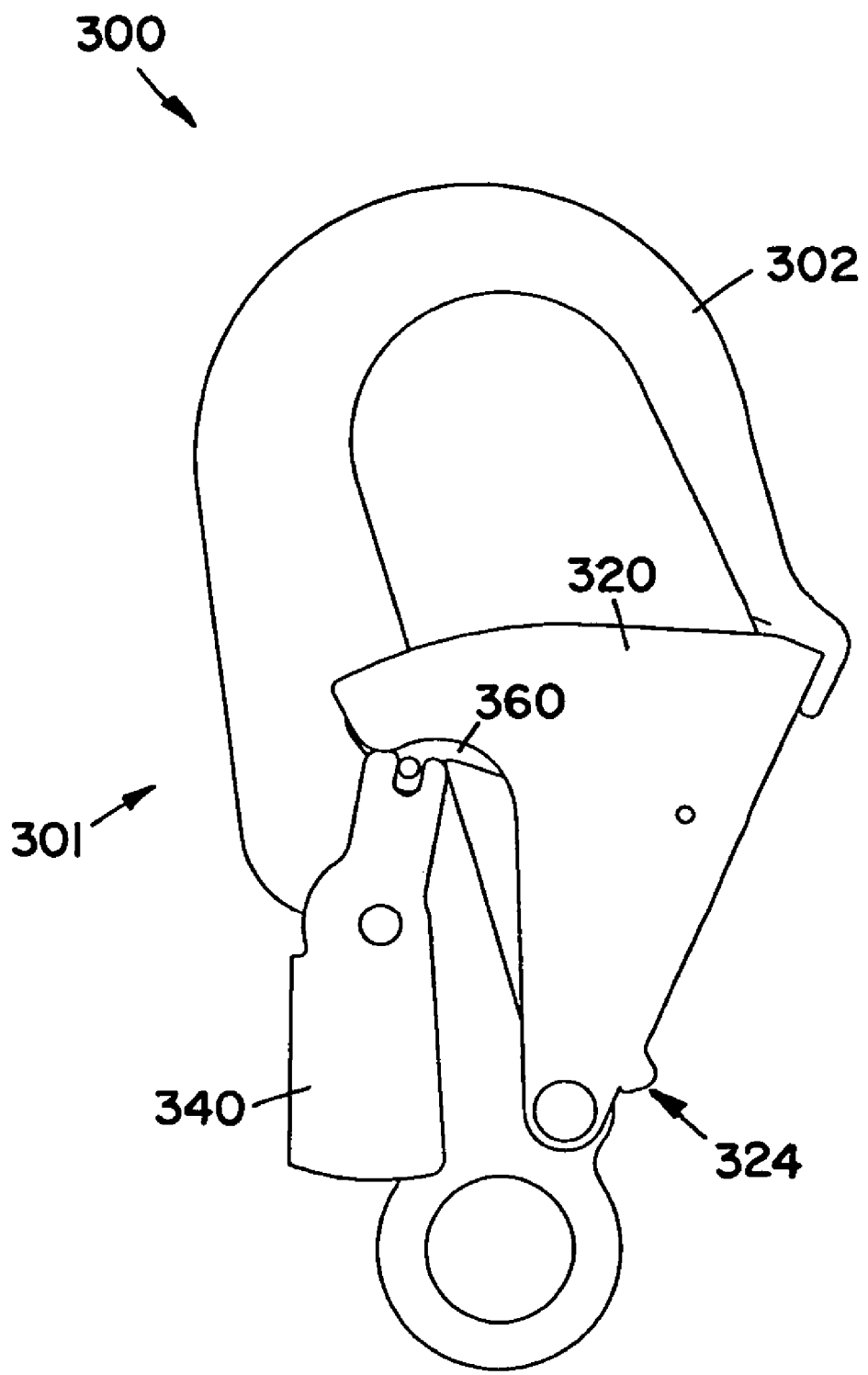
FIG. 64 is a side view of another embodiment double locking snap hook constructed according to the principles of the present invention in a locked position.
Figure 65:
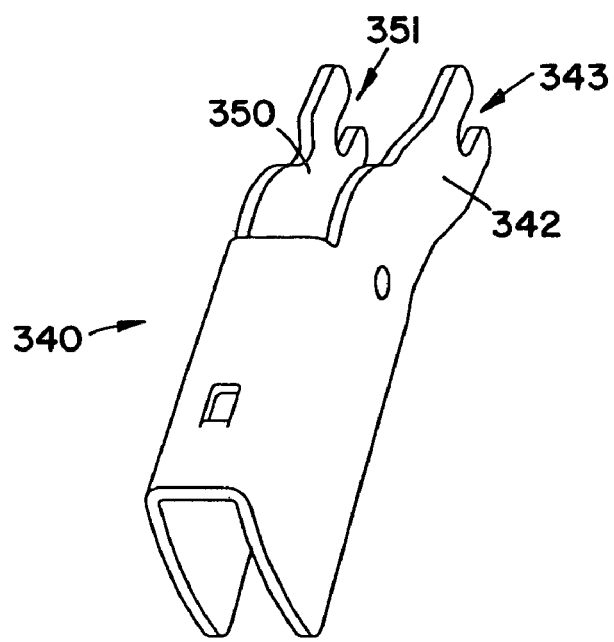
FIG. 65 is a perspective view of a trigger of the double locking snap hook shown in FIG. 64.
Figure 66:
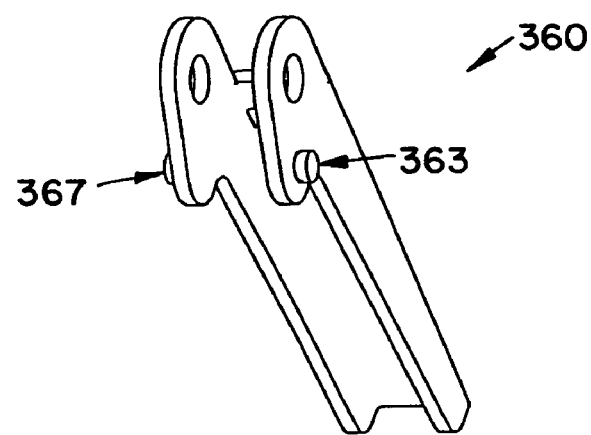
FIG. 66 is a perspective view of a lock of the double locking snap hook shown in FIG. 64.

The double locking snap hook 300 is similarly constructed to the double locking snap hook 200, but the double locking snap hook 300 provides an alternate trigger and an alternate lock to those of the double locking snap hook 200. As shown in FIG. 64, the double locking snap hook 300 includes a body 301 with a hook portion 302, a gate 320, a trigger 340, and a lock 360. As shown in FIG. 65, the trigger 340 is similarly constructed to the trigger 240, but the top portions are different. Rather than including oval-shaped apertures proximate the ends, the top portions 342 and 350 include notches 343 and 351, respectively, that are open to the ends of the top portions 342 and 350. As shown in FIG. 66, the lock 360 is similarly constructed to the lock 260, but the tines are different. Rather than including cylindrical extensions with oval-shaped flanges, the tines 363 and 367 include only cylindrical extensions. The tines 363 and 367 are preferably stamped as is well known in the art. The trigger 340 and the lock 360 assist in more easily assembling the double locking snap hook 300 because the tines 363 and 367 may simply be slid into place within the notches 343 and 351. Preferably, as shown in FIG. 64, there is a draft added to the protrusion 324 of the gate 320 to prevent cracking of the gate 320 during manufacture.

It is recognized that the components of the double locking snap hooks 100, 200, and 300 may be interchanged among the embodiments.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A double locking snap hook, comprising:
    a) a hook portion having a first end and a second end defining an opening;
    b) a gate pivotally connected to the hook portion and pivotable to close the opening in the hook portion;
    c) a lock moveably connected to the hook portion; and
    d) an actuator for moving the lock between a closed position and an open position, the actuator being a separate component from the lock, the lock in the closed position reinforcing the gate proximate the first end when the opening in the hook portion is closed and at least one of the hook portion and the gate preventing upward movement of the lock, wherein the lock allows the gate to withstand a tensile load of up to at least 3,600 pounds.

2. The double locking snap hook of claim 1, wherein the lock is pivotally connected to the hook portion.

3. The double locking snap hook of claim 1, wherein the actuator is a trigger.

4. The double locking snap hook of claim 3, wherein the hook portion includes a first pivot point, a second pivot point, and a third pivot point, the gate being pivotally connected proximate the first pivot point, the trigger being pivotally connected proximate the second pivot point, and the lock being pivotally connected proximate the third pivot point.

5. The double locking snap hook of claim 3, wherein pivoting the trigger causes the lock to pivot.

6. The double locking snap hook of claim 1, wherein the hook portion has an intermediate portion between the first end and the second end, the gate being pivotable proximate the second end and closing the opening in the hook portion proximate the first end, the lock being pivotable proximate the intermediate portion and extending toward the first end in the closed position, the actuator pivoting the lock from the closed position to the open position by pivoting the lock from proximate the first end to proximate the second end of the hook portion, wherein when the lock is in the open position the gate may be pivoted toward the intermediate portion thereby opening the opening in the hook portion.

7. The double locking snap hook of claim 1, wherein the lock in the closed position extends outward from the hook portion in a direction in which the gate is pivoted to open the gate thereby preventing the gate from opening.

8. The double locking snap hook of claim 1, wherein the gate and the actuator are spring biased thereby biasing the gate to close the opening in the hook portion and the lock to be in the closed position thereby preventing the gate from opening.

9. A double locking snap hook, comprising:
    a) a body having a hook portion, a handle portion, a front, and a rear, the hook portion having a first end, a second end, and an intermediate portion between the first end and the second end, the intermediate portion being proximate the rear and the first and second ends extending from the intermediate portion toward the front, the first and second ends defining an opening in the hook portion, the handle portion operatively connected to the hook portion proximate the second end and the intermediate portion;
    b) a gate having a top portion, a bottom portion, and a front side, the bottom portion being pivotally connected proximate the second end of the hook portion, the gate being pivotable between a closed position to close the opening in the hook portion and an open position to open the opening in the hook portion, the top portion being proximate the first end when the gate is in the closed position, the top portion being proximate the intermediate portion when the gate is in the open position; and
    c) a lock having a third end and a fourth end, the third end being pivotally connected proximate the intermediate portion, the lock being pivotable between a locked position and an unlocked position, the fourth end being proximate the first end of the hook portion and the top portion and the front side of the gate when the lock is in the locked position, the fourth end being proximate the second end of the hook portion when the lock is in the unlocked position, the fourth end of the lock contacting the front side of the gate to prevent pivoting of the gate to the open position when the lock is in the locked position, the lock in the locked position reinforcing the gate proximate the first end when the opening in the hook portion is closed thereby allowing the gate to withstand a tensile load of up to at least 3,600 pounds.

10. The double locking snap hook of claim 9, further comprising an actuator operatively connected to the lock and movement of the actuator pivots the lock.

11. The double locking snap hook of claim 10, wherein the actuator is a trigger pivotally connected to the hook portion and pivoting of the trigger pivots the lock between the locked and the unlocked positions.

12. A double locking snap hook, comprising:
   a) a body having a hook portion, a handle portion, a front, and a rear, the hook portion having a first end, a second end, and an intermediate portion between the first end and the second end, the intermediate portion being proximate the rear and the first and second ends extending from the intermediate portion toward the front, the first and second ends defining an opening in the hook portion, the handle portion connected to the hook portion proximate the second end and the intermediate portion;
   b) a gate pivotally connected to the second end of the hook portion and pivotable to close the opening in the hook portion proximate the first end of the hook portion;
   c) a lock pivotally connected to the intermediate portion of the hook portion; and
   d) an actuator for pivoting the lock between a closed position and an open position by pivoting an opposing end from proximate the first end to proximate the second end of the hook portion, the actuator being a separate component from the lock, the lock in the closed position reinforcing the gate proximate the first end when the opening in the hook portion is closed thereby allowing the gate to withstand a tensile load of up to at least 3,600 pounds.

13. The double locking snap hook of claim 12, wherein the actuator is a trigger.

14. The double locking snap hook of claim 13, wherein pivoting the trigger causes the lock to pivot.

15. The double locking snap hook of claim 12, wherein the lock in the open position allows the gate to be pivoted toward the intermediate portion thereby opening the opening in the hook portion.

16. The double locking snap hook of claim 12, wherein the lock in the closed position extends outward from the hook portion in a direction in which the gate is pivoted to open the gate thereby preventing the gate from opening.

17. The double locking snap hook of claim 12, wherein the gate and the actuator are spring biased thereby biasing the gate to close the opening in the hook portion and the lock to be in the closed position thereby preventing the gate from opening.

18. A double locking snap hook, comprising:
   a) a body having a hook portion, a handle portion, a rear, and a front, the hook portion having a first end, a second end, and an intermediate portion between the first end and the second end, the intermediate portion being proximate the rear and the first and second ends extending from the intermediate portion toward the front, the first and second ends defining an opening in the hook portion, the handle portion connected to the hook portion proximate the second end and the intermediate portion;
   b) a gate having a third end and a fourth end, the fourth end being pivotally connected to the second end to pivot the gate between a closed position and an open position, the third end being proximate the first end in the closed position and the third end being proximate the intermediate portion in the open position, the gate being pivotable from proximate the first end to proximate the intermediate portion to open and close the opening in the hook portion;
   c) a lock having a fifth end and a sixth end, the sixth end being pivotally connected to the intermediate portion to pivot the lock between a locked position and an unlocked position, the fifth end being proximate the first end in the locked position and proximate the second end in the unlocked position, the locked position preventing the gate from pivoting into the open position and the unlocked position allowing the gate to pivot into the open position, the lock in the closed position reinforcing the gate to withstand a tensile load of up to at least 3,600 pounds; and
   d) a trigger pivotally connected to the intermediate portion and to the lock, wherein pivoting the trigger relative to the hook portion pivots the lock from the locked position to the unlocked position.

19. The double locking snap hook of claim 18, further comprising a first biasing member biasing the gate in the closed position and a second biasing member biasing the trigger so that the lock is in the locked position.

20. The double locking snap hook of claim 18, wherein the trigger has a seventh end and an eighth end, the eighth end being pivotally connected to the intermediate portion and the seventh end being proximate the front and the handle portion, wherein the seventh end is moved in a direction toward the rear to pivot the lock to an unlocked position.

21. The double locking snap hook of claim 20, further comprising a biasing member biasing the seventh end in a direction away from the front thereby biasing the lock in the locked position.

22. The double locking snap hook of claim 18, wherein the trigger has a seventh end, an eighth end, and a middle portion between the seventh end and the eighth end, the eighth end being pivotally connected to the lock, the middle portion being pivotally connected to the intermediate portion and the seventh end being proximate the rear and the handle portion, wherein the seventh end is moved in a direction toward the front to pivot the lock to an unlocked position.

23. The double locking snap hook of claim 22, further comprising a biasing member biasing the seventh end in a direction away from the rear thereby biasing the lock in the locked position.

* * * * *

UNITED STATES PATENT AND TRADEMARK OFFICE
CERTIFICATE OF CORRECTION

| | |
|---|---|
| PATENT NO. | : 7,647,677 B2 |
| APPLICATION NO. | : 11/517022 |
| DATED | : January 19, 2010 |
| INVENTOR(S) | : Scott C. Casebolt |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 580 days.

Signed and Sealed this

Sixteenth Day of November, 2010

David J. Kappos
*Director of the United States Patent and Trademark Office*